(12) United States Patent
Ishihara et al.

(10) Patent No.: US 8,199,299 B2
(45) Date of Patent: Jun. 12, 2012

(54) LIQUID CRYSTAL PANEL, LIQUID CRYSTAL DISPLAY DEVICE, AND DISPLAY METHOD OF LIQUID CRYSTAL PANEL

(75) Inventors: Shoichi Ishihara, Osaka (JP); Takehisa Sakurai, Osaka (JP); Shuichi Kozaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 415 days.

(21) Appl. No.: 12/522,222

(22) PCT Filed: Jan. 31, 2008

(86) PCT No.: PCT/JP2008/051572
§ 371 (c)(1),
(2), (4) Date: Jul. 6, 2009

(87) PCT Pub. No.: WO2008/117569
PCT Pub. Date: Oct. 2, 2008

(65) Prior Publication Data
US 2010/0002158 A1    Jan. 7, 2010

(30) Foreign Application Priority Data
Mar. 23, 2007    (JP) .................................. 2007-077734

(51) Int. Cl.
*G02F 1/1343* (2006.01)
(52) U.S. Cl. .............................. 349/141; 349/33; 349/132
(58) Field of Classification Search ................. 349/33, 349/141, 123, 132, 178
See application file for complete search history.

(56) References Cited

U.S. PATENT DOCUMENTS

| | | | |
|---|---|---|---|
| 3,687,515 A | | 8/1972 | Haas et al. |
| 4,639,089 A | * | 1/1987 | Okada et al. ................... 349/156 |
| 6,493,055 B1 | * | 12/2002 | Shimoshikiryo et al. ..... 349/141 |
| 7,697,083 B2 | * | 4/2010 | Park ............................... 349/40 |

FOREIGN PATENT DOCUMENTS

| | | |
|---|---|---|
| JP | 2002-214579 | 7/2002 |
| JP | 2002-350902 | 12/2002 |
| JP | 2002-365657 | 12/2002 |
| JP | 2003-202554 | 7/2003 |
| JP | 2003-315833 | 11/2003 |

OTHER PUBLICATIONS

International Search Report for PCT/JP2008/051572, mailed Mar. 4, 2008.

(Continued)

*Primary Examiner* — Thoi Duong
(74) *Attorney, Agent, or Firm* — Nixon & Vanderhye P.C.

(57) ABSTRACT

A liquid crystal panel (10) includes a liquid crystal layer formed with a p-type liquid crystal. The liquid crystal layer exhibits homogeneous orientation while no voltage is applied. Further, an electric field is applied to the liquid crystal layer in a direction same as dipole moments ($\mu$) of liquid crystal molecules (3a) to which no voltage is applied. With these arrangements, it is possible to provide a liquid crystal panel and a liquid crystal display device, each of which adopts a new display mode that can achieve a wide viewing angle equivalent to an IPS mode, can achieve a high-speed response like an OCB mode or exceeding the OCB mode, and does not require an initial operation for orientation conversion to the bend orientation.

10 Claims, 25 Drawing Sheets

OTHER PUBLICATIONS

Yamaguchi et al., "Wide-Viewing-Angle Display Mode for the Active-Matrix LCD Using Bend-Alignment Liquid-Crystal Cell", Tohoku University, Sendai, Japan, Late-News Paper:, 19.4, (2003), pp. 277-280.

R. Kiefer et al., "In-Plane Switching of Nematic Liquid Crystals", Freiburg Germany, P2-30, (1992), pp. 547-550.

P.L. Bos et al., "An Optically Self-Compensating Electro-Optical Effect with Wide Angle View", Beaverton, OR, Tektronix Inc., 19.3:, (1993), No. P2-30, pp. 273-276.

Shimbo et al, "Ideal Liquid Crystal Display Mode Using Achiral Banana-Shaped Liquid Crystals", Jpn. J. Appl. Phys., vol. 45, No. 10, pp. L282-L284, 2006.

Yamaguchi et al., "Wide-Viewing-Angle Display Mode for the Active-Matrix LCD Using Bend-Alignment Liquid-Crystal Cell", Tohoku University, Sendai, Japan, Late-News Paper:, 19.4, (1993), pp. 277-280.

P.L. Bos et al., "An Optically Self-Compensating Electro-Optical Effect with Wide Angle of View", Beaverton, OR, Tektronix Inc., 19.3:, (1993), pp. 273-276.

* cited by examiner

Von/Voff

LIQUID CRYSTAL PANEL, LIQUID CRYSTAL DISPLAY DEVICE, AND DISPLAY METHOD OF LIQUID CRYSTAL PANEL

This application is the U.S. national phase of International Application No. PCT/JP2008/051572, filed 31 Jan. 2008, which designated the U.S. and claims priority to Japanese Patent Application No(s). 2007-077734, filed 23 Mar. 2007 the entire contents of each of which are hereby incorporated by reference.

TECHNICAL FIELD

The present invention relates to a liquid crystal panel, a liquid crystal display device, and a display method of the liquid crystal panel, each of which adopts a new display mode. Specifically, the present invention relates to a liquid crystal panel, a liquid crystal display device, and a display method of the liquid crystal panel, each of which adopts a new display mode for controlling light transmission by changing orientation of liquid crystal molecules in a liquid crystal layer from homogeneous orientation to bend orientation by applying a voltage.

BACKGROUND ART

A liquid crystal display device is characterized by a thin thickness, lightweight, and low power consumption, and is widely used in various fields. The liquid crystal display device has been dramatically improved in display performance with the years, and is now becoming superior to a CRT (cathode-ray tube).

A display mode of the liquid crystal display device is defined by how a liquid crystal is aligned in a liquid crystal cell. Various display modes such as a TN (Twisted Nematic) mode, an MVA (Multi-domain Vertical Alignment) mode, an IPS (In-Plain Switching) mode, and an OCB (Optically Compensated Birefringence) mode have been known as a display mode of the liquid crystal display device.

A large number of liquid crystal display devices adopting any of these display modes have been produced. Among these, a liquid crystal display device adopting the TN mode is generally and widely used, for example. However, the liquid crystal display device adopting the TN mode has disadvantages of low-speed response, narrow viewing angle, and the like.

In the MVA mode, liquid crystal molecules are aligned in a plurality of directions due to fringe fields generated by (i) slits respectively formed on pixel electrodes on an active matrix substrate and (ii) protrusions (ribs) respectively formed on counter electrodes of a counter substrate, the protrusions controlling the alignments of the liquid crystal molecules. The MVA mode achieves a wide viewing angle because the liquid crystal molecules incline to a plurality of directions (forms Multi-domain) while a voltage is applied. However, the MVA mode has a disadvantage of low-speed response like the TN mode.

Among the above-mentioned display modes, the IPS mode (see Non Patent Literature 3, for example) achieves a wide viewing angle with a simpler arrangement. The IPS mode is arranged so that liquid crystal molecules are switched in a plane, thereby achieving a remarkably wide viewing angle. However, the IPS mode also has a disadvantage of low-speed response like the TN mode and the MVA mode.

Among the above-mentioned display modes, the OCB mode (see Non Patent Literature 1 and Non Patent Literature 2, for example) is the only display mode that can achieve a high-speed response with a simple arrangement in which a nematic liquid crystal is simply sandwiched between two substrates that have been subjected to an alignment process so as to have a parallel alignment. Therefore, the OCB mode is highly expected particularly for an in-car system and the like which requires response performance at low temperatures.

CITATION LIST

Patent Literature 1
   U.S. Pat. No. 3,687,515 (Registration date: Aug. 29, 1972)
Patent Literature 2
   Japanese Patent Application Publication, Tokukai, No. 2003-315833 (Publication date: Nov. 6, 2003)
Non Patent Literature 1
   P. L. Bos and J. A. Rahman, "An Optically "Self-Compensating" Electro-Optical Effect with Wide Angle of View", Technical Digest of SID Symp., p 273-276, 1993.
Non Patent Literature 2
   Y. Yamaguchi, T. Miyashita, and T. Uchida, "Wide-Viewing-Angle Display Mode for the Active-Matrix LCD Using Bend-Alignment Liquid-Crystal Cell", Technical Digest of SID Symp., p 277-280, 1993.
Non Patent Literature 3
   R. Kiefer, B. Weber, F. Windschield, and G. Baur, "In-Plane Switching of Nematic Liquid Crystals", Proc. The 12th Int'l Disp. Res. Conf. (Japan Display '92), No. P2-30, p 547-550, 1992.
Non Patent Literature 4
   Yoshio Shinbo, Yoichi Takanishi, Ken Ishikawa., Ewa Gorecka, Damian Pociecha, Jozef Mieczkowski, King a Gomola and Hideo Takezoe, Jpn. J. Appl. Phys., Vol. 45, No. 10, pL282-L284, 2006.

SUMMARY OF INVENTION

The OCB mode achieves a high-speed response, however, has a problem of cost increase. The cost increase can occur in the OCB mode because, at the time of power-on operation, it is necessary to perform an orientation conversion from initial splay orientation to bend orientation for driving, and therefore it is necessary to provide an initial orientation conversion driving circuit other than a normal driving circuit. In addition, there is a problem that the OCB mode is inferior to the IPS mode in viewing angle characteristic.

As described above, there has been no such a practical liquid crystal panel or liquid crystal display device that can achieve a wide viewing angle equivalent to the IPS mode and can achieve a high-speed response like the OCB mode or exceeding the OCB mode, that is, there has been no such a liquid crystal panel or liquid crystal display device that can achieve a high-speed response and a wide viewing angle at the same time. Further, there has been no such a liquid crystal panel or a liquid crystal display device that can practically achieve bend orientation without the initial operation for orientation conversion to the bend orientation.

The present invention has been accomplished in view of the conventional problems above, and an object of the present invention is to provide a liquid crystal panel, a liquid crystal display device, and a display method of the liquid crystal panel, each of which adopts a new display mode that does not require an initial operation for orientation conversion to the bend orientation and can achieve a wide viewing angle equivalent to an IPS mode and achieve a high-speed response like an OCB mode or exceeding the OCB mode.

In order to attain the object, a liquid crystal panel in accordance with the present invention is a liquid crystal panel including an optical modulation layer formed with a liquid crystal material, the liquid crystal material being a p-type liquid crystal and being constituted by liquid crystal molecules that exhibit homogeneous orientation while no voltage is applied, and electric field application onto the optical modulation layer being carried out in a direction substantially same as a direction of dipole moments of the liquid crystal molecules to which no voltage is applied.

A display method of the liquid crystal panel in accordance with the present invention is a display method of a liquid crystal panel including an optical modulation layer formed with a liquid crystal material, the method including: providing a p-type liquid crystal as the liquid crystal material; causing liquid crystal molecules of the liquid crystal material to exhibit homogeneous orientation while no voltage is applied; and applying an electric field to the optical modulation layer in a direction substantially same as a direction of dipole moments of the liquid crystal molecules exhibiting the homogeneous orientation.

In the field of liquid crystal, an orientation direction may normally vary within a range of ±5 degrees. Therefore, a direction of the dipole moment of the liquid crystal molecule to which no voltage is applied may vary ±5 degrees from a direction of the applied electric field, although it is preferable these directions exactly corresponds to each other.

In the liquid crystal panel for displaying with the display method includes the liquid crystal material being a p-type liquid crystal and being constituted by liquid crystal molecules that exhibit homogeneous orientation while no voltage is applied, and electric field application onto the optical modulation layer being carried out in a direction same (or substantially same) as a direction of dipole moments of the liquid crystal molecules to which no voltage is applied, Therefore, the liquid crystal molecules of the liquid crystal material exhibit bend orientation curved in a thickness direction of a substrate while an electric field is applied.

In order to attain the object, a liquid crystal panel in accordance with the present invention is a liquid crystal panel comprising an optical modulation layer formed with a liquid crystal material and provided between a pair of substrates, at least one of the substrates being transparent, the liquid crystal material being constituted by liquid crystal molecules that exhibit homogeneous orientation while no voltage is applied, and the liquid crystal molecules exhibiting bend orientation curved in a thickness direction of the substrates, while an electric field is applied.

In order to attain the object, a liquid crystal display device in accordance with the present invention includes the liquid crystal panel.

As described above, in the liquid crystal panel, an electric field is applied in a direction substantially same as (substantially parallel to) the dipole moments of the liquid crystal molecules exhibiting the homogeneous orientation. Therefore, a direction of the applied electric field is substantially same (does not vary, or varies within ±5 degrees) as directions of the dipole moments of the liquid crystal molecules to which no electric field is applied and to which an electric field is applied. This means that the liquid crystal molecules continuously change their orientation from the homogeneous orientation, not from splay orientation as in the OCB mode, to bend orientation. Therefore, the liquid crystal panel does not require an operation for orientation conversion to the bend orientation. Further, since the liquid crystal molecules in the optical modulation layer, i.e., a liquid crystal layer, consistently exhibit bend orientation at the time of driving (at the time of electric field application), flow of the liquid crystal molecules occurred when the liquid crystal molecules rotate assists the rotation of the liquid crystal molecules as in the OCB mode. This allows a high-speed response for switching gray scales.

Further, in the liquid crystal panel, orientation of refractive index ellipsoid (direction of a long axis of the refractive index ellipsoid) that indicates an optical characteristic of the optical modulation layer (liquid crystal layer) is consistently in a same direction as an applied electric field while a voltage is applied. This allows a higher degree of freedom of phase plate designing than the IPS mode, in which orientation of refractive index ellipsoid differs between while no electric field is applied and while an electric field is applied, and the refractive index ellipsoid rotates in response to electric-field application. This makes it possible to achieve a wide viewing angle.

Therefore, with the arrangements, it is possible to provide a display method of a display panel, a liquid crystal panel, and a liquid crystal display device, each of which adopts a new display method (display mode) that can achieve a wide viewing angle equivalent to the IPS mode, can achieve a high-speed response like the OCB mode or exceeding the OCB mode, and does not require an initial operation for orientation conversion to the bend orientation.

REFERENCE SIGNS LIST

1: SUBSTRATE
2: SUBSTRATE
3: LIQUID CRYSTAL LAYER
3a: LIQUID CRYSTAL MOLECULE
4: POLARIZING PLATE
5: POLARIZING PLATE
6: SUBSTRATE
7: SUBSTRATE
8: INTERLEAVE ELECTRODE
9: INTERLEAVE ELECTRODE
10: LIQUID CRYSTAL PANEL
11: ALIGNMENT FILM
12: ALIGNMENT FILM
13; SPACER
14: SEALING AGENT
15: LIQUID CRYSTAL CELL
20: LIQUID CRYSTAL PANEL
21: PHASE DIFFERENCE FILM
30: DRIVING CIRCUIT

40: BACKLIGHT UNIT
μ: DIPOLE MOMENT

DESCRIPTION OF EMBODIMENTS

First Embodiment

One embodiment of the present invention is described below with reference to FIGS. 1 through 13 and 19 through 31.

In a liquid crystal display panel and a liquid crystal display device in accordance with the present embodiment, a phase difference in a liquid crystal layer is changed due to disarray of liquid crystal molecules caused according to a distribution of electric field intensity generated by electric field application in a liquid crystal cell of the liquid crystal panel. As a result of diligent study on mechanisms of liquid crystal orientation, the inventors of the present invention have found a novel driving method (driving system) that can generate bend orientation without an operation for orientation conversion to the bend orientation. With this method, the bend orientation can be generated by applying a distorted horizontal electric field to a liquid crystal layer that initially exhibits homogeneous orientation (antiparallel). This driving system in accordance with the present embodiment is hereinafter referred to as "TBA (Transverse Bend Alignment) mode" in view of the above-mentioned unique state of liquid crystal orientation at the time of electric field application.

Figure 31:
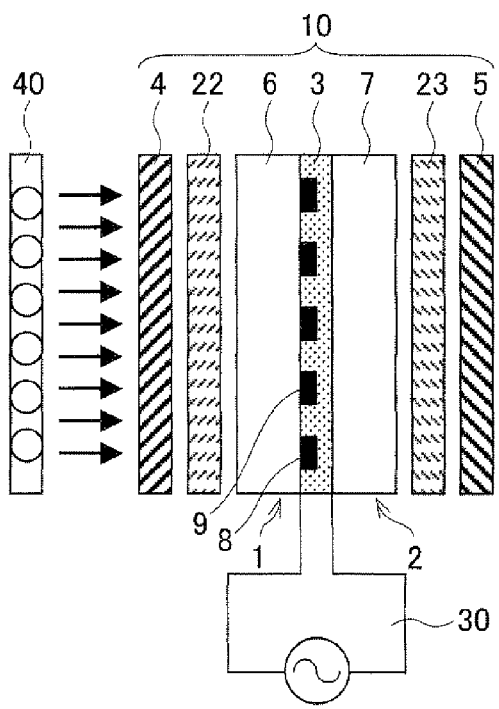
FIG. 31 is an exploded cross-sectional view schematically illustrating an arrangement of a liquid crystal display device in accordance with one embodiment of the present invention.

FIG. 31 is an exploded cross-sectional view schematically illustrating an arrangement of a liquid crystal display device in accordance with the present embodiment.

Figure 1:
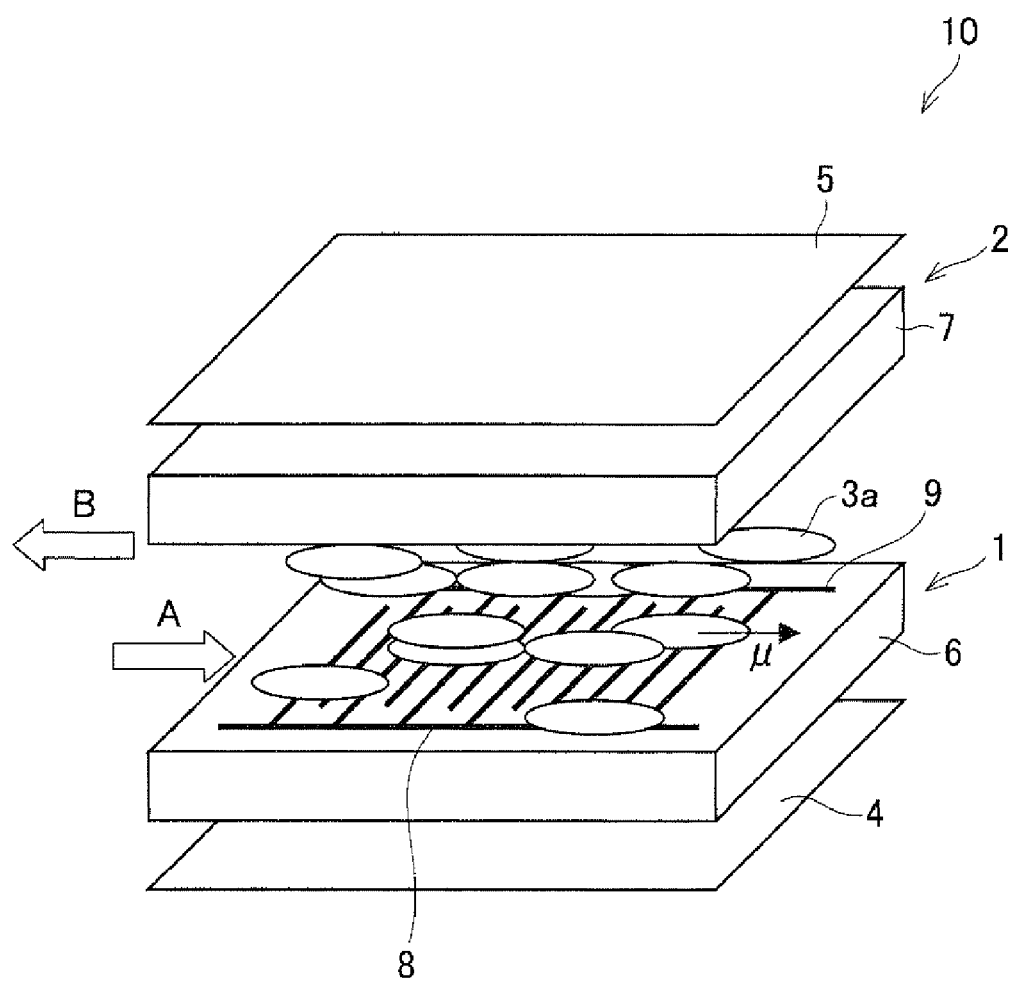
FIG. 1 is an exploded perspective view schematically illustrating an arrangement of a main part of a liquid crystal panel of a liquid crystal display device in accordance with one embodiment of the present invention.
Figure 2:
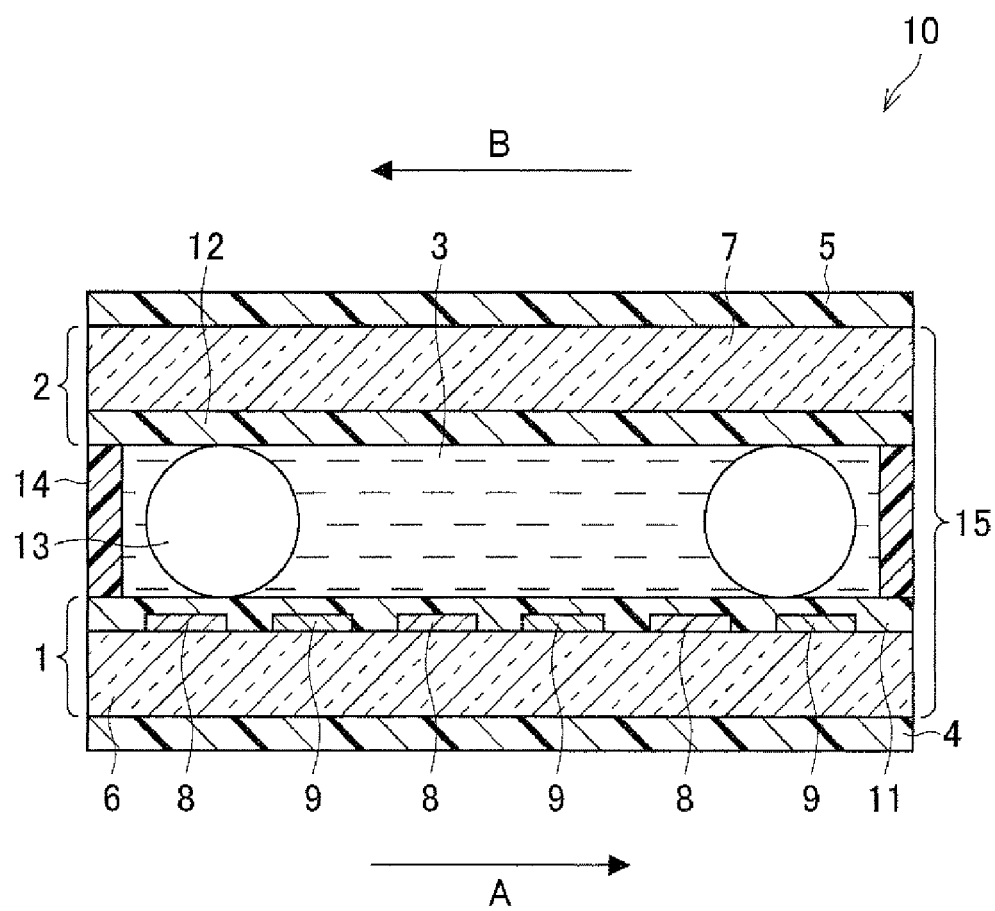
FIG. 2 is a cross-sectional view schematically illustrating an arrangement of a main part of a liquid crystal panel of a liquid crystal display device in accordance with one embodiment of the present invention.

As shown in FIG. 31, a liquid crystal display device in accordance with the present embodiment includes a liquid crystal panel 10 and a driving circuit 30, and further includes a backlight unit 40 or the like as a back light source, if necessary. The driving circuit 30, the backlight unit 40 and the like have a structure similar to a conventional art, respectively. Therefore, these components are not further described or shown in drawings hereinafter. FIGS. 1 and 2 show an arrangement of a typical panel as an example of the liquid crystal panel 10 constituting the liquid crystal display device in accordance with the present embodiment.

FIG. 1 is an exploded perspective view schematically illustrating an arrangement of a main part of a liquid crystal panel provided in a liquid crystal display device in accordance with the present embodiment. FIG. 2 is a cross-sectional view schematically illustrating an arrangement of a main part of a liquid crystal panel provided in a liquid crystal display device in accordance with the present embodiment. Note that a substrate on a display surface side (on an observer side) is referred to as an upper substrate, and a substrate facing the upper substrate (a substrate on the backlight unit 40 side in a transmissive liquid crystal display device, for example) is referred to as a lower substrate, hereinafter.

As shown in FIGS. 1, 2, and 31, the liquid crystal panel 10 in accordance with the present embodiment includes a pair of substrates 1 and 2 (electrode substrate and counter substrate) that face each other, and a liquid crystal layer 3, serving as an optical modulation layer that carries out a display based on optical response, which is sandwiched between the substrates 1 and 2 as shown in FIG. 2. The electrode substrate and the counter substrate may be an array substrate and a color filter substrate, respectively, for example.

As shown in FIGS. 1, 2, and 31, polarizing plates 4 and 5 are provided on outer sides of the pair of substrates 1 and 2, respectively, that is, the polarizing plates 4 and 5 are provided on respective surfaces of the substrates 1 and 2, which surfaces are opposite to surfaces thereof facing each other.

As shown in FIG. 31, phase plates 22 and 23 are provided between the substrate 1 and the polarizing plate 4 and between the substrate 2 and the polarizing plate 5, respectively, if necessary. In FIG. 31, the phase plates 22 and 23 are provided on a back and front sides (specifically, between the substrate 1 and the polarizing plate 4 and between the substrate 2 and the polarizing plate 5) of the liquid crystal panel 10, respectively. However, the present embodiment is not limited to this, and may be arranged so that a phase plate is provided on only either one of the sides. In a case of a display device that uses only light transmitted in the front direction of the liquid crystal panel 10, the phase plates 22 and 23 are not necessarily provided.

In FIG. 31, the substrate on the backlight unit 40 side is an array substrate, and the counter substrate facing the array substrate is a color filter substrate including a color filter (not shown). However, the present invention is not limited to this. Particularly, the color filter is unnecessary in a case of a liquid crystal display device adopting a field sequential driving system, which utilizes a high-speed response that is one of the features of the present invention. By using the liquid crystal display device adopting the field sequential driving system, it is possible to use light highly efficiently.

An arrangement of the liquid crystal panel 10 is described below in detail with reference to FIGS. 1, 2, and 31.

At least one (upper substrate) of the substrates 1 and 2 includes, as a member for supporting a liquid crystal layer, a transparent substrate such as a glass substrate that is transparent. In the present embodiment hereinafter, the substrates 1 and 2 are arranged so as to respectively include transparent substrates 6 and 7, each of which is made of glass, as the member for supporting the liquid crystal layer. However, the present embodiment is not limited to this.

On a surface of the substrate 1, which surface faces the substrate 2, more specifically, on a surface of the substrate 6, which surface faces the substrate 7, interleave electrodes (comb-like electrodes) 8 and 9 are provided so as to interleave with each other. The interleave electrodes 8 and 9 are electric-field applying members for applying an electric field (horizontal electric field) to the liquid crystal layer 3 parallel or maybe substantially parallel to a substrate plane.

In the present embodiment, a width (line width), a thickness, and an interelectrode distance (electrode interval) of the interleave electrodes 8 and 9 are not particularly limited. However, the interelectrode distance is preferably small so that an electric field is largely distorted and therefore a change in phase difference becomes large.

Specifically, it is preferable that the interelectrode distance is 1 μm or more and less than 10 μm. If the interelectrode distance is less than 1 μm, it is difficult to produce the electrodes. On the other hand, if the interelectrode distance is 10 μm or more, it is necessary to apply a high driving voltage.

The interleave electrodes 8 and 9 may be made from a transparent electrode material such as ITO (indium tin oxide), or a metal such as aluminium, for example, as described later in Examples. The interleave electrodes 8 and 9 are not particularly limited in material from which they are made.

As shown in FIG. 2, an alignment film 11 is provided over the interleave electrodes 8 and 9.

On a surface of the substrate 2, which surface faces the substrate 1, more specifically, on a surface of the substrate 7, which surface faces the substrate 6, a functional film (not shown) such as an undercoat film and a color filter is provided if necessary. Further, an alignment film 12 is provided on the surface of the substrate 2. In a case where the functional films are provided, the alignment film 12 is formed so as to cover the functional films. It should be noted that the alignment films 11 and 12 are not shown in FIGS. 1 and 31.

The alignment films 11 and 12 have a surface subjected to an alignment process such as rubbing, so that liquid crystal molecules 3a in the liquid crystal layer 3 are aligned parallel and in a same direction.

The alignment films 11 and 12 are not particularly limited in material from which they are made of. The alignment films 11 and 12 may be made from a known alignment film material such as polyimide, for example. Specifically, it is possible to use various commercially-available materials such as "SE-7492" (product name, alignment film coat material of NISSAN CHEMICAL INDUSTRIES, LTD.) having a pretilt angle of approximately 4 degrees or "PIX-5400" (product name, alignment film coat material of Hitachi Chemical) having a pretilt angle of approximately 1 degree.

In this regard, however, a large pretilt angle causes an increase in possibility of disclination at the time of driving. Therefore, it is preferable that a pretilt angle of each of the alignment films 11 and 12 is less than 10 degrees. Further, for the purpose of reducing a driving voltage, it is preferable that the alignment films 11 and 12 have a small surface anchoring energy.

As shown in FIG. 2, for example, a liquid crystal cell 15 of the liquid crystal panel 10 is formed by attaching the substrate 1, on which the interleave electrodes 8 and 9 and the alignment film 11 are provided, to the substrate 2, on which the alignment film 12 is provided, with a sealing agent 14 provided around a pixel region, and with spacers 13 such as plastic beads, glass fiber spacers, or the like provided between the substrates and then by filling a space between the substrates 1 and 2 with a liquid crystal material which serves as a display medium for constituting an optical modulation layer.

Figure 3:
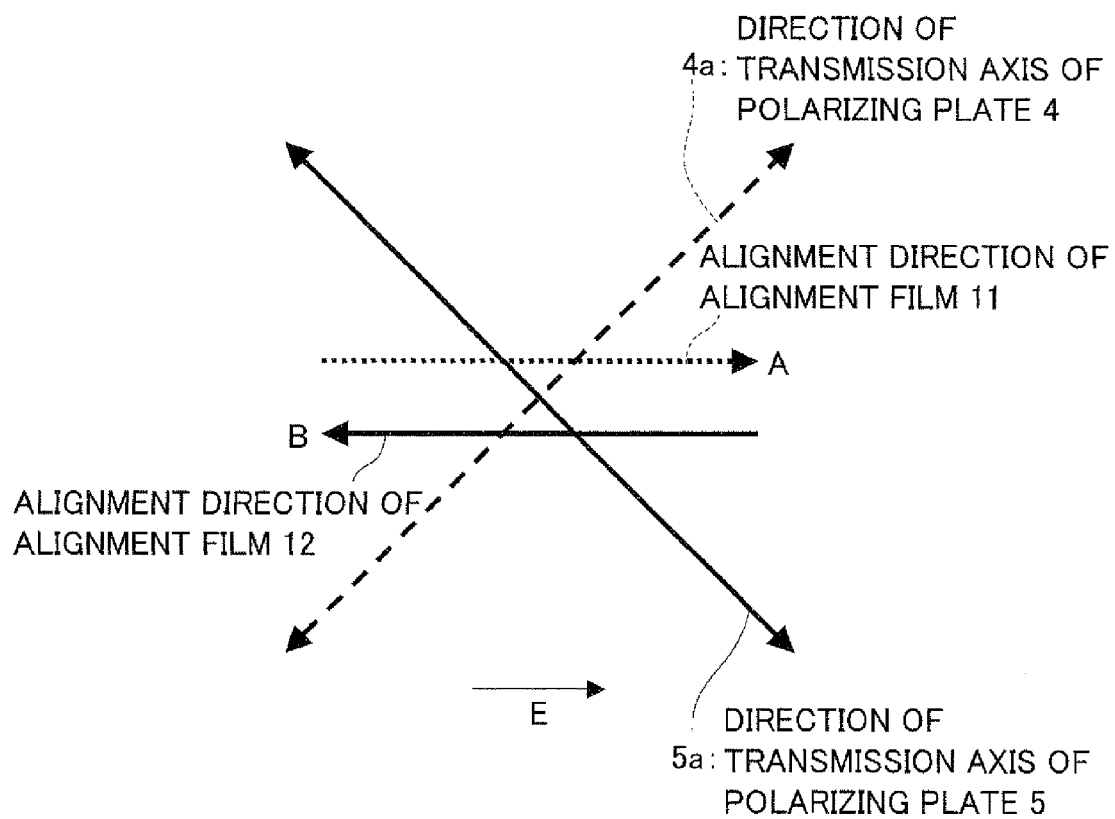
FIG. 3 is a view illustrating a relation between directions of alignment process and directions of respective transmission axes of polarizing plates of the liquid crystal panel shown in FIG. 2.

The liquid crystal 10 is formed by attaching the polarizing plates 4 and 5 to outer surfaces of the liquid crystal cell 15, respectively. FIG. 3 shows a relation between directions of respective transmission axes of polarizing plates 4 and 5 (indicated by the arrow 4a and an arrow 5a, respectively) and directions of alignment processes applied to the alignment films 11 and 12, respectively (indicated by the arrow A and an arrow B, respectively).

As described above, in the liquid crystal display device in accordance with the present embodiment, a phase difference in the liquid crystal layer 3 is changed due to disarray of liquid crystal molecules caused according to a distribution of electric-field intensity generated by electric field application in the liquid crystal cell 15 of the liquid crystal panel 10.

Therefore, in the present embodiment, it is preferable to use a liquid crystal material that has a large refractive index anisotropy ($\Delta n$) and has a large dielectric anisotropy ($\Delta \in$). Generally, a liquid crystal material having a large $\Delta n$ or a large $\Delta \in$ has a large polarity and therefore tends to be contaminated with ionic impurities. In view of this, for practical purposes, it is preferable to use an F (fluorinated) liquid crystal material rather than a CN (cyano-) liquid crystal material. The distribution of electric-field intensity generated by an applied electric field tends to be more saturated as the electric-field intensity is increased. Therefore, increasing $\Delta n$ is more efficient than increasing $\Delta \in$ when designing a material.

The present embodiment achieves a high-speed response like an OCB mode since the liquid crystal molecules 3a exhibit a bend alignment at the time of driving as described later. Considering that the liquid crystal molecules 3a rotate in response to electric-field application, it is preferable that a liquid crystal material of the present embodiment has a low viscosity.

The liquid crystal material used in the present embodiment uses is a so-called p-type liquid crystal in which a long axis of refractive index ellipsoid of a liquid crystal molecule 3a is parallel to a substrate plane and a direction of dipole moment is parallel to the long axis. The present embodiment is described hereinafter by referring to an example where a p-type nematic liquid crystal is used as the p-type liquid crystal. However, the present embodiment is not limited to this.

As shown in FIGS. 1 through 3, the substrates 1 and 2 (specifically, the alignment films 11 and 12 provided on the substrates 1 and 2, respectively) are subjected to an alignment process (horizontal alignment process) so as to have alignments parallel to the substrate plane and in opposite directions to each other as indicated by arrows A and B, respectively. Therefore, while no voltage is applied, the liquid crystal molecules 3a of the liquid crystal layer 3 exhibit homogeneous orientation in which respective dipole moments p of the liquid crystal molecules 3a are in a substantially same direction (a substantially same direction in the present embodiment, however, preferably a same direction). In FIG. 1, an arrow $\mu$ indicates a direction of dipole moment of a liquid crystal molecule 3a.

In the liquid crystal display device in accordance with the present embodiment, an electric field is applied in a direction substantially same as (a direction substantially parallel to) the dipole moments of the liquid crystal molecules 3a which exhibit homogeneous orientation, so that the orientation of the liquid crystal molecules 3a is continuously changed from the homogeneous orientation, not from splay orientation as in the OCB mode, to the bend alignment.

In the present embodiment, which uses a p-type liquid crystal where a dipole moment $\mu$ is in a direction parallel to a tong axis of a liquid crystal molecule 3a, a horizontal electric field parallel (may be substantially parallel) to a substrate plane is applied in a direction substantially same as the dipole moment $\mu$ of the liquid crystal molecule 3a via, for example, the interleave electrodes 8 and 9 to the liquid crystal molecules 3a that have been homogeneously aligned by the horizontal alignment process as described above. In other words, the dipole moment p of the liquid crystal molecule 3a is arranged so as to be in a direction substantially same as the applied electric field at the stage of initial orientation.

In the field of liquid crystal, an orientation direction (orientation order degree) may normally vary within a range of 5 degrees. Therefore, a direction of the dipole moment p of the liquid crystal molecule 3a to which no voltage is applied may vary ±5 degrees from a direction of the applied electric field, although it is preferable these directions exactly corresponds to each other.

Figure 4:
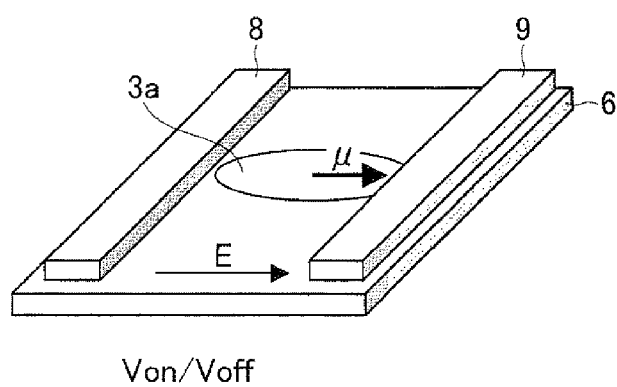
FIG. 4 is a view illustrating a relation between a direction of electric-field application and dipole moments, represented by a refractive index ellipsoid, of a liquid crystal molecule to which no electric field is applied and to which an electric field is applied, according to the present invention.

FIG. 4 illustrates a relation between a direction of an applied electric field in accordance with the present embodiment and a dipole moment p, represented by a refractive index ellipsoid, of a liquid crystal molecule 3a to which no voltage is applied (Voff) and to which a voltage is applied (Von). For convenience of explanation, the direction of the applied electric field is indicated by an arrow E in each drawing. In addition, the applied electric field may be referred to as an applied electric field E.

There has been no such a liquid crystal display device that a direction of dipole moment p of a liquid crystal at the stage of initial orientation is substantially parallel to a direction of an applied electric field E.

All known liquid crystal display devices are arranged so that a direction of dipole moment p of a liquid crystal molecule at the state of initial orientation differs from a direction of an applied electric field. There has never been an idea of making these directions correspond to each other.

Figure 5:
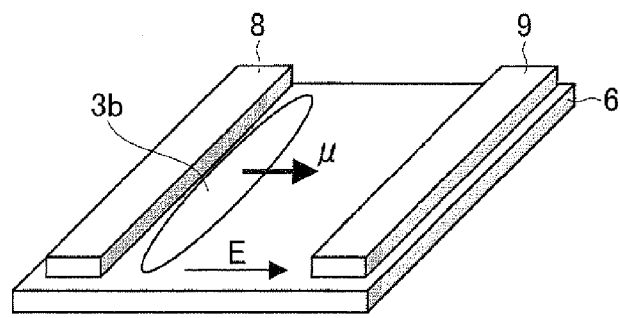
FIG. 5 is a view illustrating a relation between a direction of electric-field application and a dipole moment, represented by a refractive index ellipsoid, of a liquid crystal molecule in the liquid crystal panel shown in FIG. 2 in which an n-type liquid crystal is used instead of a p-type liquid crystal.

It has been believed that, in a case where a direction of dipole moment µ of a liquid crystal molecule at the stage of initial orientation is parallel to a direction of an applied electric field, voltage application does not cause any action (movement of the liquid crystal molecules). In fact, when an n-type liquid crystal, in which a dipole moment p is in a direction of a short axis of a liquid crystal molecule, is used instead of the p-type liquid crystal in the liquid crystal panel 10 as shown in FIG. 5, application of a horizontal electric field via the interleave electrodes 8 and 9 does not cause any action of liquid crystal molecules (liquid crystal molecule 3b) of the n-type liquid crystal.

A currently known liquid crystal display device is generally driven by an alternating electric field. It is common practice for such a liquid crystal display device that a direction of an applied electric field E is different from that of a dipole moment µ while no voltage is applied.

The inventors of the present invention have studied electrode arrangements and distributions of electric-field intensity in a cell and actively used results of the study, thereby accomplishing the present invention. That is, the present invention is based on finding of a novel electrooptical response (display mode). The present invention makes it possible to achieve a wide viewing angle equivalent to an IPS mode and a high-speed response like an OCB mode or exceeding the OCB mode even with a simple arrangement. Further, with the present invention, it is unnecessary to carry out an initial operation for orientation conversion to the bend orientation unlike the OB mode. The present invention could have never been accomplished by known techniques, including the arrangements described above in Background Art. The electrooptical response of a liquid crystal panel 10 in accordance with the present embodiment is described below in detail in comparison to known liquid crystal panels.

Figure 6:
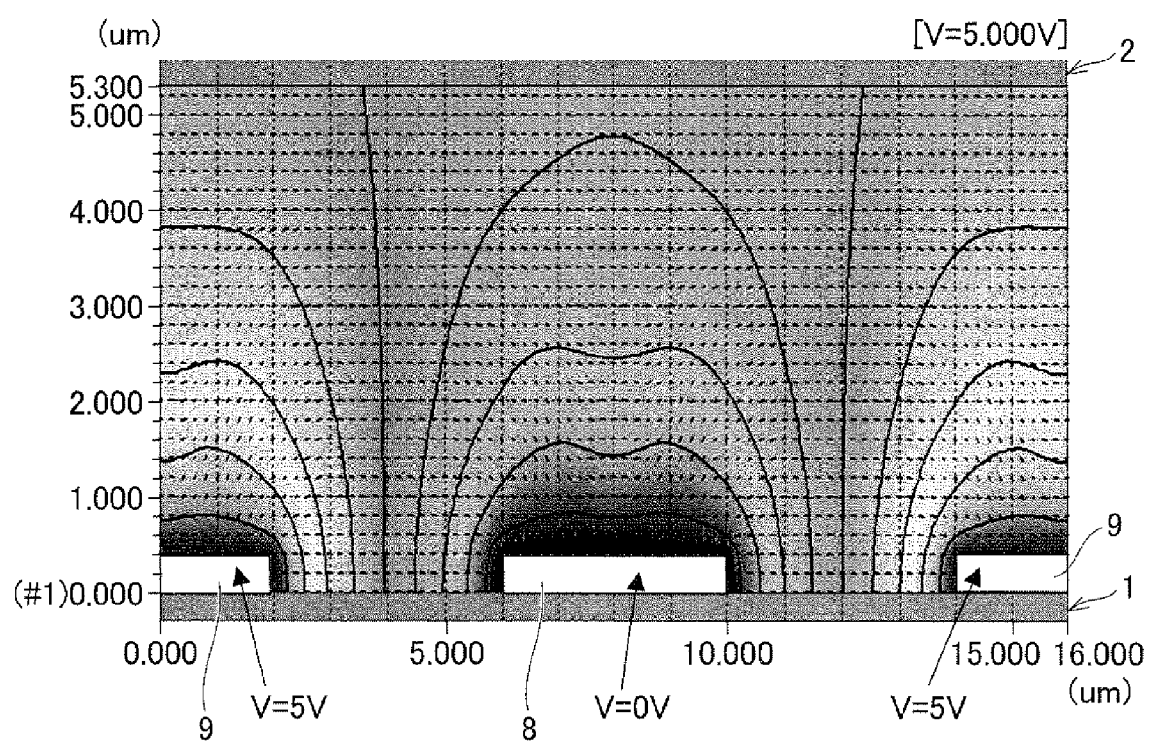
FIG. 6 is a view illustrating an equipotential curve that indicates an electric potential distribution generated in a liquid crystal cell when a voltage of 5V is applied to interleave electrodes of the liquid crystal panel shown in FIGS. 1 and 2.

FIG. 6 is a view showing an equipotential curve which indicates an electric potential distribution in the liquid crystal cell 15 when a voltage of 5V is applied to the interleave electrodes 8 and 9 of the liquid crystal panel 10 shown in FIGS. 1 and 2. A width and electrode interval of each of the interleave electrodes 8 and 9 are set to 4 µm. A thickness (t) of each of the interleave electrodes 8 and 9 is set to 0.4 µm, and a thickness of the liquid crystal layer 3 is set to 5.3 µm. A liquid crystal material used herein is 5 CB (pentyl cyanobiphenyl).

Figure 7:
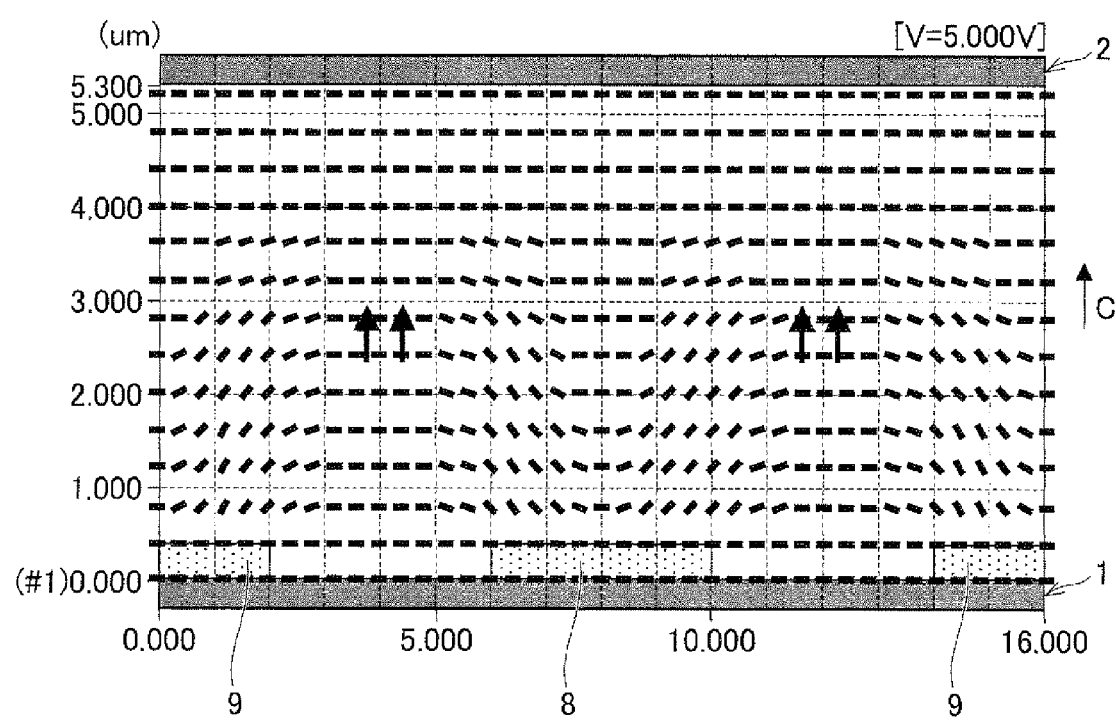
FIG. 7 is a view illustrating a distribution of liquid crystal orientation generated in a liquid crystal cell of the liquid crystal panel shown in FIG. 2.

Liquid crystal molecules 3a are aligned according to the distribution of electric-field intensity and a boundary motion-restricting force of substrates 1 and 2. FIG. 7 illustrates a liquid crystal orientation distribution (liquid crystal director distribution) in the liquid crystal cell 15. In this embodiment, a pretilt angle is set to 0°. FIG. 7 shows that orientation of the liquid crystal molecules 5a is continuously changed from homogeneous orientation to bend orientation (bend alignment) in response to electric field application, and the liquid crystal molecules 3a exhibit bend orientation (bend alignment) not in a direction perpendicular to the substrates (bend alignment in a vertical direction), but in a direction parallel (substantially parallel) to the substrate plane, that is, in a horizontal direction, unlike the OCB mode.

At the state of the bend orientation, it is possible to achieve a high-speed response. However, in order to generate such a state, it is conventionally necessary to arrange so that a liquid crystal layer initially exhibits splay orientation and the splay orientation is changed to the bend orientation by application of a voltage equal to or more than a critical driving voltage Vc.

A display principle of the OCB mode is described below with reference to FIGS. 19(a) through 19(c). Each of FIGS. 19(a) through 19(c) is a cross-sectional view schematically illustrating an arrangement of a typical liquid crystal panel (OCR panel) for carrying out a display with an OCR mode. FIG. 19(a) illustrates a state of the panel to which no voltage is applied (V=0). FIG. 19(b) illustrates a state of the panel at the time of white display generated by voltage application (V=V1). FIG. 19(c) illustrates a state of the panel at the time of black display generated by voltage application (V=V2).

Note that a substrate on a display surface side (observer side) is referred to as an upper substrate, and a substrate facing the upper substrate is referred to as a lower substrate.

As shown in FIGS. 19(a) through 19(c), in an OCB panel 100, a liquid crystal layer 104 including liquid crystal molecules 104a is sandwiched between a pair of substrates 103 each including an electrode 102 that is provided on a glass substrate 101; and an optical compensation film 105 and a polarizing plate 106 are provided in this order on a surface of each substrate, which surface is on the opposite side to the liquid crystal layer 104.

As shown in FIG. 19(a), in the OCB panel 100, the liquid crystal molecules 104a in the liquid crystal layer 104 exhibit horizontal (splay) orientation while no voltage is applied. This splay orientation can be generated by applying an alignment process to both of the upper and lower substrates 103 in a single direction (in FIG. 19(a), in a direction of an arrow A, which points right on paper).

Then, a voltage equal to or more than a critical driving voltage is applied between the substrates 103 so that the orientation of the liquid crystal layer 104, which is sandwiched between the substrates 103, is changed from the splay orientation shown in FIG. 19(a) to curved orientation (bend orientation) shown in FIGS. 19(b) and 19(c).

A liquid crystal display device using the OCB panel carries out a display by changing an applied voltage (V) between V1 (white display) and V2 (black display) (Vc<V1<V2) while the OCB panel is in the state of bend orientation.

That is to say, in the OCB mode, the liquid crystal layer 104 exhibits splay orientation while no voltage is applied, and then, while the liquid crystal layer 104 is in the initial state, a high voltage of a particular waveform which is different from a normal driving voltage is applied between the electrodes 102 at the time of power-on operation of the device. In response to this, the splay orientation is changed to bend orientation (splay-bend orientation conversion). Then, a certain voltage (driving voltage) is applied so that the device carries out a display.

In the OCB mode, once the bend orientation is generated, the liquid crystal layer 104 does not exhibit the initial splay orientation again unless the voltage (V) becomes smaller than the critical driving voltage (Vc). However, before carrying out a display, the OCB mode should perform an orientation conversion operation for changing orientation from the splay orientation, which is the initial orientation, to the bend orientation. Therefore, as described above, the OCB mode has a possibility of cost increase since an initial orientation conversion driving circuit is required in addition to a normal driving circuit.

The critical driving voltage (Vc) is a voltage by which free energy of the liquid crystal layer 104 in the state of splay orientation becomes equal to that of the liquid crystal layer 104 in the state of bend orientation. The critical driving voltage (Vc) is determined according to physical properties of a liquid crystal, a tilt angle of liquid crystal molecules 104a on a substrate boundary, anchoring energy at the substrate boundary, an atmosphere temperature, and the like. When the applied voltage (V) smaller than Vc is applied thereon, the splay orientation can be stably exhibited. On the other hand, when the applied voltage (V) equal to or more than Vc is applied thereon, the bend orientation can be stably exhibited. Therefore, it is difficult to carry out the splay-bend orientation conversion operation uniformly over the panel in a short period of time. This is a practical problem in the OCB mode.

A reason why the OCB mode can achieve a high-speed response is described below with reference to FIGS. 20(a) and 20(b) and FIGS. 21(a) and 21(b). FIGS. 20(a) and 20(b) are cross-sectional views of the OCB panel 100, which views schematically show a direction of flow in a liquid crystal layer 104 generated at the time of switching from a black display (V=V2) to a white display (V=V1). FIG. 20(a) is a cross-sectional view schematically illustrating an arrangement of a main part of the OCB panel 100 at the time of black display. FIG. 20(b) is a cross-sectional view schematically illustrating an arrangement of a main part of the OCB panel 100 at the time of white display.

FIGS. 21(a) and 21(b) are cross-sectional views of a liquid crystal panel (TN panel 200) adopting a TN mode, which views schematically show a direction of flow in a liquid crystal layer 204 generated at the time of switching from a black display (Von, a voltage is applied) to a white display (Voff, no voltage is applied). FIG. 21(a) is a cross-sectional view schematically illustrating an arrangement of a main part of the TN panel 200 at the time of black display. FIG. 21(b) is a cross-sectional view schematically illustrating an arrangement of a main part of the TN panel 200 at the time of white display.

The OCB mode achieves a high-speed response due to a unique orientation (bend orientation), In the OCB mode, while displaying, the liquid crystal layer 103 consistently exhibits bend orientation as shown in FIGS. 20(a) and 20(b), and expresses gray scales by changing a degree of bend orientation (degree of curve) according to an applied voltage. When a voltage applied to the OCB panel 100 is changed from V=V2 to V=V1 as shown in FIGS. 20(a) and 20(b), flow in the liquid crystal layer 104 generated by rotation of liquid crystal molecules 104a comes to be in a direction as shown in FIG. 20(b). That is, flow in a region closer to an upper substrate 103 (region above a center part of the liquid crystal layer 103) is in the same direction as flow in a region closer to a lower substrate 103 (region below the center part of the liquid crystal layer 103). Therefore, in the OCR mode, torque is applied in a single direction as indicated by arrows A. This allows the liquid crystal molecules 104a to rotate without interfering with each other. By this, it becomes possible to achieve a high-speed response.

In the TN mode, when an applied voltage is changed from Von to Voff as shown in FIGS. 21(a) and 21(b), flow in a liquid crystal layer 204 generated by rotation of liquid crystal molecules 204a comes to be in a direction as shown in FIG. 21(b). That is, flow in a region closer to an upper substrate 203 (region above a center part of the liquid crystal layer 204) is in an opposite direction to flow in a region closer to a lower substrate 203 (region below the center part of the liquid crystal layer 204). Therefore, in the TN mode, torque is applied in opposite directions as indicated by arrows A and B. This causes the liquid crystal molecules 204a to interfere with each other when rotating. This makes a response slow.

As described above, the OCB mode achieves a high-speed response due to bend orientation. The bend orientation is generated by application of a sufficiently larger voltage than a critical driving voltage (Vc) to a liquid crystal layer exhibiting splay orientation.

As described above, in the OCB mode, the liquid crystal molecules 104a consistently exhibit bend orientation while a voltage is applied. Therefore, in the OCB mode, from whatever angle ($\theta1$, $\theta2$) the liquid crystal layer 104 is seen, there exist a region where liquid crystal molecules 104a are seen from a direction of their long axes and a region where liquid crystal molecules 104a are seen from a direction of their short axes, as shown in FIG. 19(c). The OCB panel 100 adopting such an OC mode can display independently of viewing angle because of having a self-compensation effect, which is achieved by the regions that mutually compensate a phase difference in the liquid crystal layer 104.

However, if the liquid crystal layer 104 is seen from a direction not shown on paper, it is impossible to achieve the self-compensation effect such that alignment of the liquid crystal layer 104 itself allows phase difference to be independent from viewing angle. Therefore, as shown in FIGS. 19(a) through 19(c), optical compensation by optical compensation films (phase plates) 105 is required (see Non Patent Literature 1 and Non Patent Literature 2).

An optical characteristic of a liquid crystal is generally represented by a refractive index ellipsoid. The refractive index ellipsoid has a shape of a rugby ball like a liquid crystal molecule 104a shown in FIGS. 19(a) through 19(c). In order to optically compensate the refractive index ellipsoid, it is necessary to provide a phase plate whose refractive index ellipsoid has a flat spherical shape that is generally called a "bun" shape (a pumpkin shape, in the Western countries).

In other words, since the liquid crystal molecules 104a exhibit bend alignment (bend orientation) while displaying in the CGB mode, it is necessary that the phase plate is arranged so that a main axis of the bun-shaped refractive index ellipsoid is continuously changed in a thickness direction of the phase plate. As such a phase plate, "WV film" (product name) made by FUJIFILM Corporation is known. However, with this phase plate, it is necessary to precisely control, in three dimensions, alignment of a discotic liquid crystal in the phase plate according to liquid crystal alignment of a liquid crystal panel. This has been an obstacle to adoption of the OCB mode.

An IPS mode is a display mode in which liquid crystal molecules rotate in a substrate plane, and is characterized by a wide viewing angle.

Figure 22:
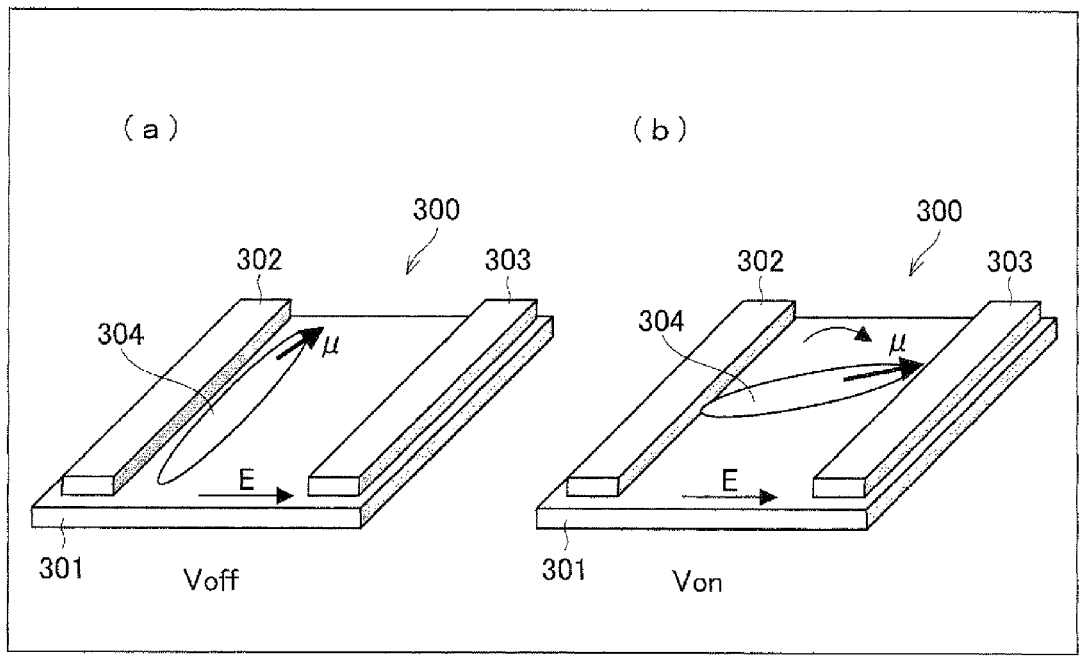
FIG. 22 Each of (a) and (b) is a perspective view of a main part of an IPS panel adopting an IPS mode, in which a p-type nematic liquid crystal serving as a p-type liquid crystal is used as a liquid crystal material, which view illustrates rotation of a liquid crystal molecule with a refractive index ellipsoid. Shown in (a) is a perspective view of the panel to which no voltage is applied. Shown in (b) is a perspective view of the panel to which a voltage is applied.
Figure 23:
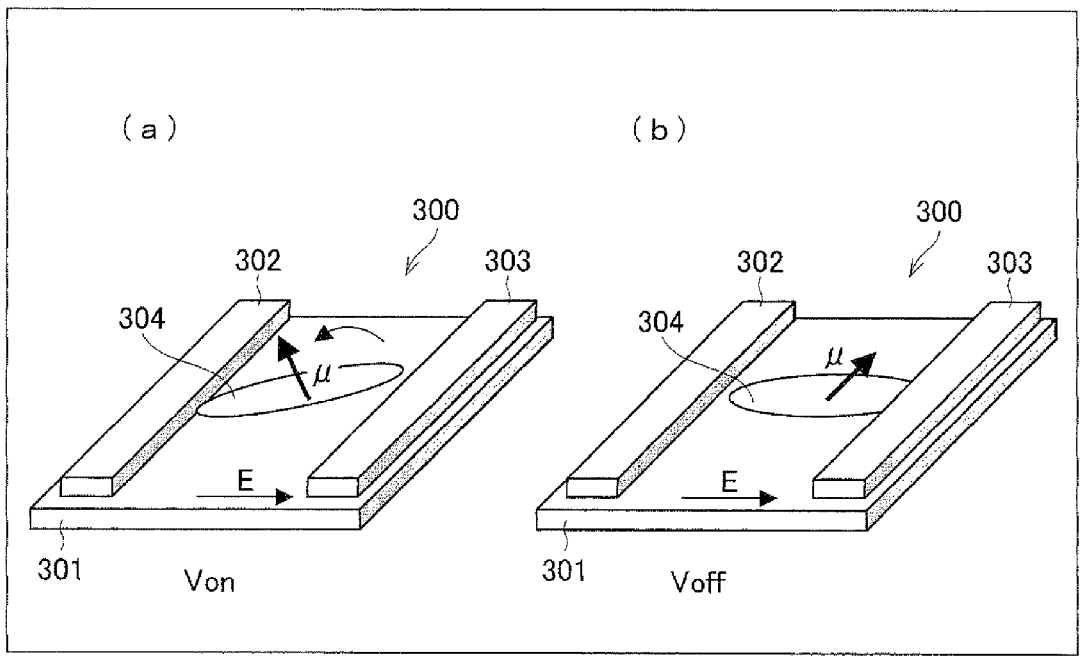
FIG. 23 Each of (a) and (b) is a perspective view of a main part of a liquid crystal panel (IPS panel) adopting an IPS mode, in which an n-type nematic liquid crystal serving as an n-type liquid crystal is used as a liquid crystal material, which view illustrates rotation of a liquid crystal molecule by means of a refractive index ellipsoid. Shown in (a) is a perspective view of the panel to which no voltage is applied. Shown in (b) is a perspective view of the panel to which a voltage is applied.

A display principle of the IPS mode is described below with reference to FIGS. 22(a), 22(5), 23(a), 23(b), 24, 25(a) and 25(b).

FIGS. 22(a) and 22(b) are perspective views schematically illustrating rotation of a liquid crystal molecule with a refractive index ellipsoid for the case of a liquid crystal panel (IPS panel) adopting an IPS mode whose liquid crystal material is a p-type nematic liquid crystal which serves as a p-type liquid crystal. FIGS. 23(a) and 23(b) are perspective views schematically illustrating rotation of a liquid crystal molecule with a refractive index ellipsoid for the case of a liquid crystal panel (IPS panel) adopting an IPS mode whose liquid crystal material is an n-type nematic liquid crystal which serves as an n-type liquid crystal. Each of FIGS. 22(a) and 23(a) is a perspective view of a main part of the IPS panel to which no voltage is applied (Voff). Each of FIGS. 22(b) and 23(b) is a perspective view of the main part of the IPS panel to which a voltage is applied (Von). Note that an arrow $\mu$ shown in each of FIGS. 22(a), 22(b), 23(a), and 23(b) indicates a direction of dipole moment p of the liquid crystal molecule.

Figure 24:
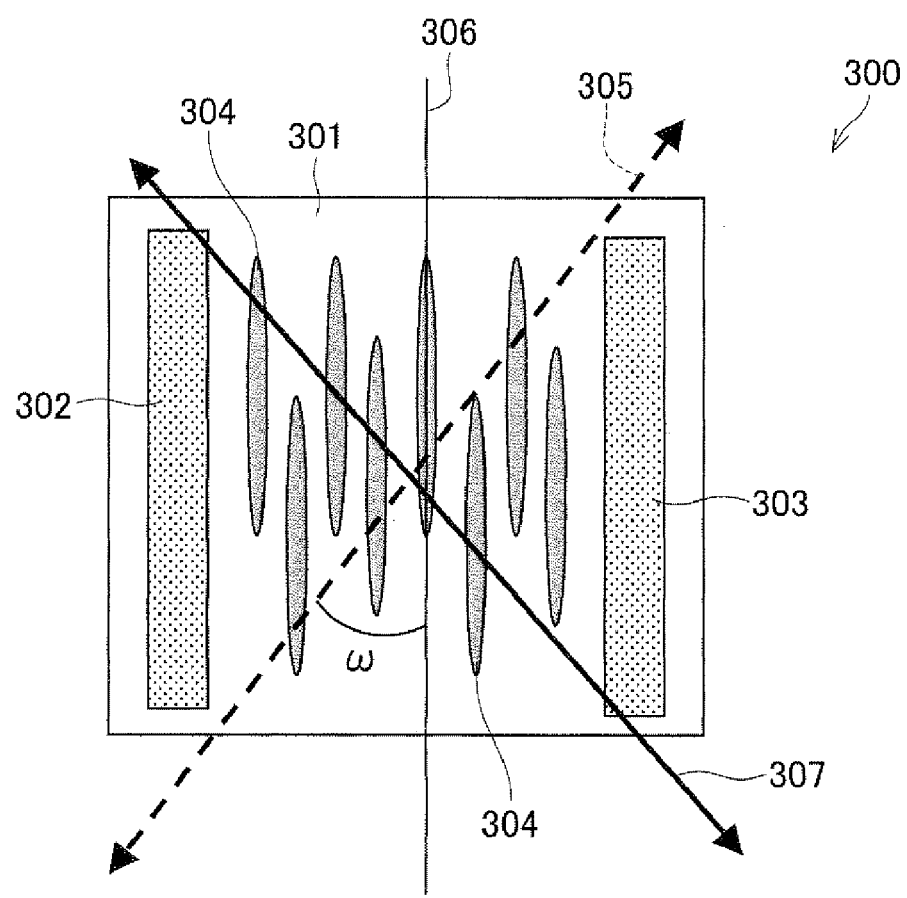
FIG. 24 is a plan view schematically illustrating an axial arrangement of components provided in a main part of the IPS panel shown in (a) and (b) of FIG. 22.
Figure 25:
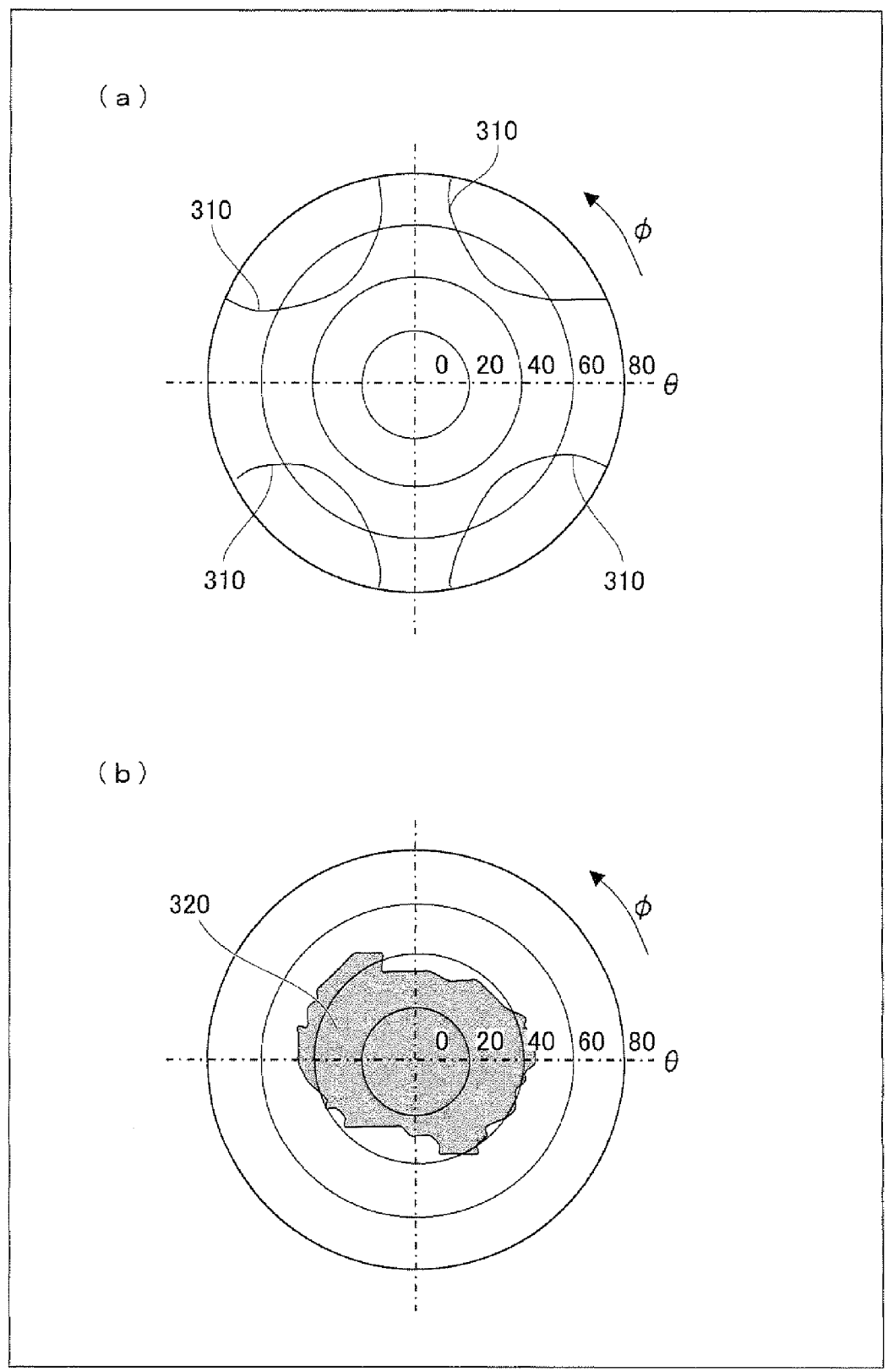
FIG. 25 Shown in (a) is a graph showing a relation between (i) a viewing angle ($\theta$, $\Phi$) with respect to a front direction of an IPS panel and (ii) an iso-contrast curve indicating a contrast ratio (CR) of 100:1. Shown in (b) is a graph showing a relation between (i) a viewing angle ($\theta$, $\Phi$) with respect to the front direction of the IPS panel and (ii) a region where $\Delta Cu'v'$ is less than 0.02.

FIG. 24 is a plan view schematically illustrating an axial arrangement of components provided in a main part of an IPS panel as shown in FIGS. 22(a) and 22(b). As shown in FIG. 24, a transmission axis 305 of a polarizing plate on a light source side (a light incident side) of the IPS panel forms crossed Nicols with a transmission axis 306 of a polarizing plate on an observer side.

As shown in FIGS. 22(a), 22(b), 23(a), and 23(b), the liquid crystal panel (IPS panel) adopting the IPS mode includes a substrate 301 and a pair of electrodes (interleave electrodes) 302 and 303 that face each other. Further, in the IPS panel, a liquid crystal layer is sandwiched between the substrate 301 and a counter substrate (not shown), and an electric field (horizontal electric field) is applied to the liquid crystal layer via the electrodes 302 and 303 in a direction parallel to a substrate plane. This causes liquid crystal molecules 304 to rotate in a plane parallel to the substrate plane (a direction of axis, e.g., long axis, of a refractive index ellipsoid is changed). In this way, a display is carried out. Therefore, the liquid crystal molecules 304 do not rise in a direction perpendicular to the substrate plane. This makes it possible to essentially achieve a wide viewing angle.

In a case where the p-type nematic liquid crystal is used as the liquid crystal material as described above, a dipole moment p of a liquid crystal molecule 304 is in a direction of a long axis of a refractive index ellipsoid of the liquid crystal molecule 304. While no voltage is applied, the dipole moment p is oriented, in the plane parallel to the substrate plane, in a direction substantially perpendicular to a direction of an applied electric field E as shown in FIG. 22(a). When a voltage is applied, the dipole moment p rotates so as to be parallel to the direction of the applied electric field indicated by an arrow E as shown in FIG. 22(b).

In a case where the n-type nematic liquid crystal is used as the liquid crystal material, a dipole moment p of a liquid crystal molecule 304 is in a direction of a short axis of a refractive index ellipsoid of the liquid crystal molecule 304. While no voltage is applied, the dipole moment p is oriented, in the plane parallel to the substrate plane, in a direction substantially perpendicular to a direction of an applied electric field E as shown in FIG. 23(a). When a voltage is applied, the dipole moment p rotates so as to be parallel to the direction of the applied electric field indicated by an arrow E as shown in FIG. 23(b).

Transmittance T in the IPS mode is represented by the following equation (1), where ω is an angle between (i) a transmission axis of a polarizing plate closer to a light source, which axis is indicated with the transmission axis 305 of the polarizing plate closer to the light source, and (ii) an orientation direction of the liquid crystal molecule 304, which is indicated by the arrow 306, as illustrated in FIG. 24. Note that a transmission axis of a polarizing plate on a display surface side is indicated with the reference sign 307.

Math. 1

$$T = \sin^2(2\omega)\sin^2\left(\frac{\pi \Delta n d}{\lambda}\right) \quad (1)$$

where Δn is refractive index anisotropy of the liquid crystal material; d is a thickness of the liquid crystal layer; and λ is a wavelength of light to be used.

In the IPS mode, a phase difference Δnd in the equation (1) is constant since the liquid crystal molecule 304 rotates in the substrate plane, and a change in ω causes modulation of transmitted light. With the IPS mode, it is possible to achieve CR≧~100:1 within a viewing angle of ±85° in either vertical or horizontal direction, where CR (contrast ratio) is a ratio between luminance in the state of white display and that in the state of black display. However, in the IPS mode, a main axis of a refractive index ellipsoid which defines an optical characteristic of a liquid crystal rotates so as to change, according to an applied electric field, its direction from one perpendicular to a direction of the applied electric field to one parallel to the direction of the applied electric field. Therefore, the IPS mode cannot be considered as sufficiently achieving viewing angle characteristics in terms of independency of hue from viewing angle.

FIGS. 25(a) and 25(b) are graphs each showing a color change in hue at a front direction of an IPS panel occurred when a viewing angle (θ, Φ) is changed. FIG. 25(a) is a graph showing a relation between a viewing angle (θ, Φ) with respect to the front direction of the IPS panel and an iso-contrast curve 310 indicating a contrast ratio (CR) of 100:1. FIG. 25(b) is a graph showing a relation between a viewing angle (θ, Φ) with respect to the front direction of the IPS panel and a region 320 where ΔCu'v', which is an evaluation index of dependence of hue on viewing angle and is represented by the following equation (2), is less than 0.02 (ΔCu'v'<0.02).

Math. 2

$$\Delta Cu'v' = \sqrt{(\Delta u')^2 + (\Delta v')^2} \quad (2)$$

It is generally considered that a color change acceptable in a TV is ΔCu'v'<0.02, and a further improvement to the color change is required. The evaluation index of dependence of hue on viewing angle can be calculated by (i) displaying a rachel color on a display screen, (ii) measuring a color coordinate (u', v') from various viewing angles including a front angle, and then (iii) calculating a distance in a (u', v') coordinate system between (u', v') measured from the front direction and (u', v') measured from a given viewing angle.

In a case of a test cell not having a color filter, the (u', v') coordinate is calculated by using spectra of respective RGB colors of transmitted light.

It is known that a response time E of a liquid crystal display device can be represented by the following equation:

Math. 3

$$\tau \approx \frac{\gamma_1 d^2}{k_{\text{eff}}} \quad (3)$$

where d is a cell gap; $\gamma_1$ is liquid crystal rotational viscosity; and $K_{\text{eff}}$ is a liquid crystal elastic constant.

The response time τ in the IPS mode and in a VA mode are $K_{\text{eff}}$ to $K_{22}$ and $K_{\text{eff}}$ to $K_{33}$, respectively, and $K_{33}$ is two to three times greater than $K_{22}$. Therefore, a response of the IPS mode is generally slower than that of the VA mode. This can cause a problem of tailing of a moving image at the time of displaying. Further, the IPS mode cannot be suitably used in a mobile device or an on-vehicle device, which requires a high-speed response at a low temperature.

In contrast, a TEA mode in accordance with the present embodiment can achieve a high-speed response for switching gray scales since a liquid crystal layer 3 is consistently exhibits bend alignment at the time of normal driving. As a liquid crystal display device that utilizes bend orientation, only a liquid crystal device adopting the OCB mode has been known. Therefore, the present invention, which does not essentially require an orientation conversion operation to the bend orientation, is extremely large in practical value.

It is considered that a reason why the TBA mode exhibits a high-speed response is that, like the OCB mode, flow of liquid crystal molecules 3a is generated in such a direction that assists the liquid crystal molecules 3a to rotate when the liquid crystal molecules 3a are to rotate. That is to say, in the TBA mode, when Voff (no electric field is applied) is switched to Von (an electric field is applied), flow in a liquid crystal layer 3 occurred due to rotation of the liquid crystal molecules 3a is generated in a single direction between interleave electrodes 8 and 9 as shown in FIG. 7. Therefore, in the TBA mode, torque is applied in a single direction as indicated by an arrow C. This prevents the liquid crystal molecules 3a from interfering with each other when rotating. Therefore, it is possible to achieve a high-speed response.

In general, a viewing angle characteristic of a liquid crystal display device depends on a viewing angle characteristic in the state of black display. The TAB mode can achieve a high-speed response due to bend orientation as described above, and also can achieve a black level within a wide viewing angle since compensation is easily done with a polarizing plate because of exhibition of homogeneous orientation while no voltage is applied. As shown in FIG. 4, since a direction of a refractive index ellipsoid (direction of a long axis of the refractive index ellipsoid) indicating an optical characteristic of the liquid crystal layer 3 consistently corresponds to that of an applied electric field E while a voltage is applied, the direction of the refractive index ellipsoid becomes different between while no electric field is applied and while an electric field is applied, as described later. Therefore, in the TBA mode, the compensation can be more easily done with the phase plate than in the IPS mode in which a refractive index ellipsoid rotates in response to application of an electric field. This makes it possible for the TBA mode to attain a wide hue viewing angle characteristic.

Differences in display principle and arrangement between the present invention and a liquid crystal panel adopting other driving system similar to the present invention is described below in detail with regard to a direction of a dipole moment μ of a liquid crystal and a direction of an applied electric field E.

As a driving system in which a horizontal electric field is applied to a liquid crystal layer like the liquid crystal panel 10 of the present embodiment, an electric field-effect liquid crystal display device adopting a driving system called flexo-electric mode, which utilizes a flexo-electric effect, has been known besides the IPS mode (see Patent Literature 1). The flexo-electric mode is the only known driving system for driving with a direct-current field.

An operation mechanism (display principle) of the flexo-electric mode is described below with reference to FIGS. 26, 27(a), and 27(b).

Figure 26:
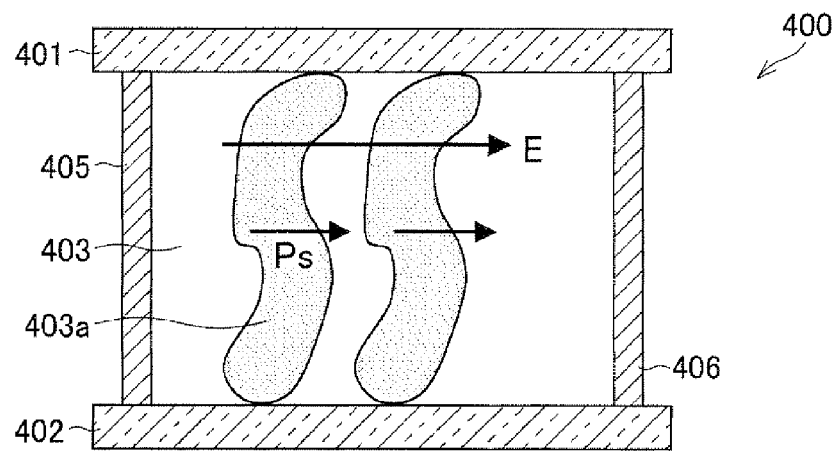
FIG. 26 is a cross-sectional view schematically illustrating an arrangement of a typical flexoelectric panel which carries out a display with a flexoelectric mode.
Figure 27:
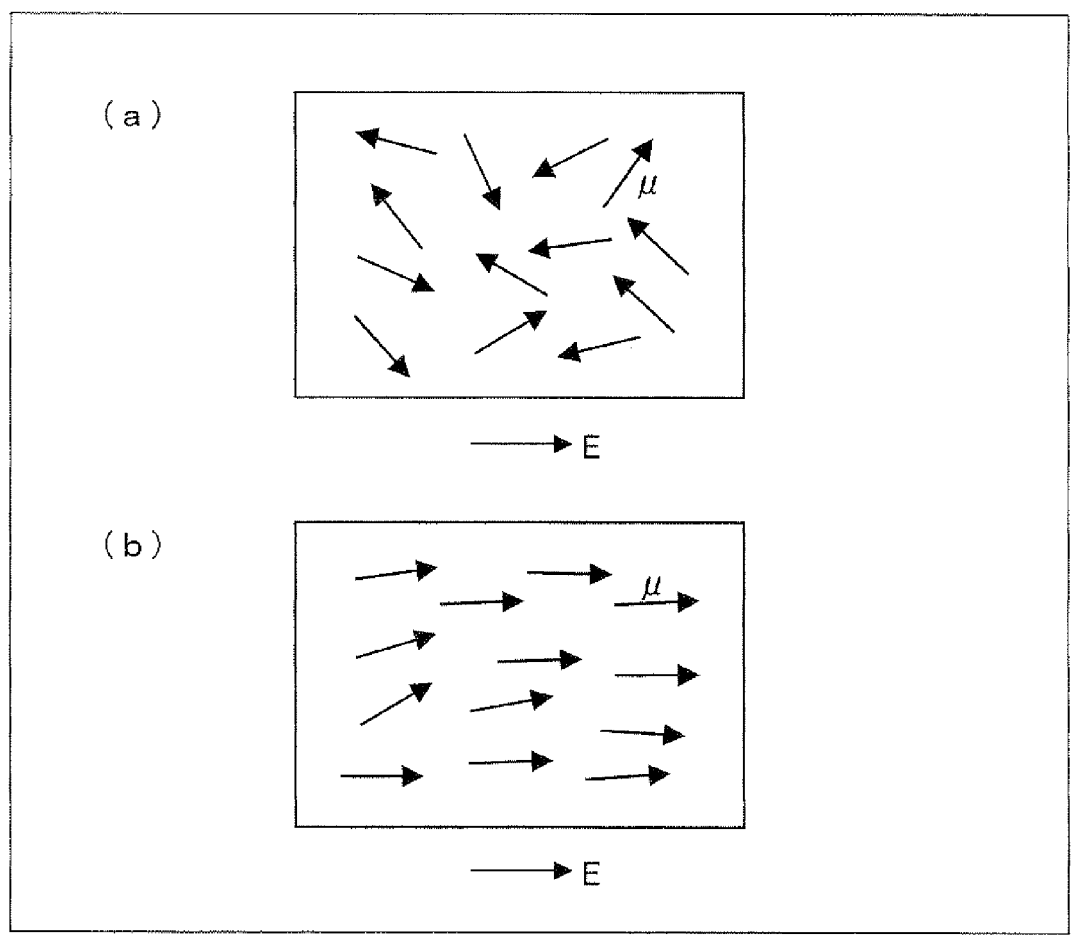
FIG. 27 Each of (a) and (b) is a plan view illustrating directions of respective dipole moments of liquid crystal molecules in the flexoelectric panel shown in FIG. 26. Shown in (a) is a plan view illustrating a state in which no electric field is applied. Shown in (b) is a plan view illustrating a state in which an electric field is applied.

FIG. 26 is a cross-sectional view schematically illustrating an arrangement of a typical liquid crystal panel (flexo-electric panel) for displaying with a flexo-electric mode. FIGS. 27(a) and 27(b) are plan views each illustrating directions of respective dipole moments p of liquid crystal molecules in the flexo-electric panel shown in FIG. 26. FIG. 27(a) is a plan view illustrating a state in which no electric field is applied (Voff state). FIG. 27(b) is a plan view illustrating a state in which an electric field is applied (Von state).

An flexo-electric panel 400 includes a liquid crystal layer 403 constituted by an n-type nematic liquid crystal (p-methoxybenzylidene-p'-n butyl-aniline), a pair of substrates 401 and 402 that sandwich the liquid crystal layer 403, and columnar electrodes 404 and 405 provided between the substrates 401 and 402. In the flexo-electric panel 400, liquid crystal molecules 403a are aligned perpendicular to a substrate plane, and application of a horizontal electric field via the columnar electrodes 404 and 405 gives the liquid crystal layer 403 a biaxial characteristic. By this, an amount of transmitted light is controlled.

In the flexo-electric panel 400, the liquid crystal molecules 403a initially exhibit vertical orientation, and dipole moments p of the liquid crystal molecules 403a are randomly oriented in a plane parallel to the substrate plane as shown in FIG. 27(a) while no electric field is applied. On the other hand, when a direct-current electric field is applied to the liquid crystal layer 403 in a horizontal direction, the liquid crystal molecules 403a that have been oriented in a direction different from a direction of an applied electric field E becomes oriented in the same direction as the applied electric field E as shown in FIG. 27(b). This disarrays liquid crystal alignment, and therefore causes the liquid crystal layer 403 to have the biaxial characteristic. By sandwiching the liquid crystal layer 403 with two polarizing plates whose transmission axes are orthogonal to each other, it becomes possible for light to transmit through the panel.

In the flexo-electric panel 400 in an initial state, the liquid crystal molecules are uniformly oriented in the vertical direction, however, the dipole moments μ are randomly oriented. Further, the liquid crystal layer does not exhibit bend orientation. Therefore, the flexo-electric mode differs from the TBA mode in orientation states of liquid crystal molecules to which no electric field is applied and to which an electric field is applied. Further, the flexo-electric mode carries out a display by utilizing the flexo-electric effect, and therefore differs from the TBA mode in operation mechanism. Furthermore, the flexo-electric panel 400 cannot sufficiently exhibit the biaxial characteristic, which is induced according to an applied electric field, and therefore cannot be regarded as practical.

Figure 28:
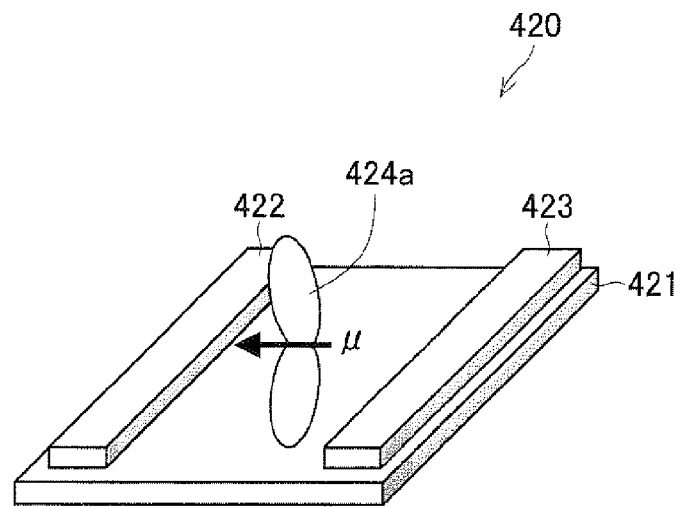
FIG. 28 is a cross-sectional view schematically illustrating an arrangement of a flexoelectric panel which carries out a display with a flexoelectric mode with the use of a banana-shaped liquid crystal.

A flexo-electric panel 420 is also known as a liquid crystal panel (flexo-electric panel) that carries out a display by utilizing the flexo-electric effect (see Non Patent Literature 4). In the flexo-electric panel 420, as shown in FIG. 28, banana-shaped liquid crystal (smectic liquid crystal) molecules 424a each having a dipole moment μ in a short-axis direction of the molecule are oriented perpendicular to a plane of a substrate 421, and a horizontal electric field is applied to the liquid crystal molecules via interleave electrodes 422 and 423 so that the liquid crystal molecules are uniformly oriented in a liquid crystal layer while the electric field is applied. In this way, the flexo-electric panel 420 controls an amount of transmitted light. An example of the banana-shaped liquid crystal is shown below.

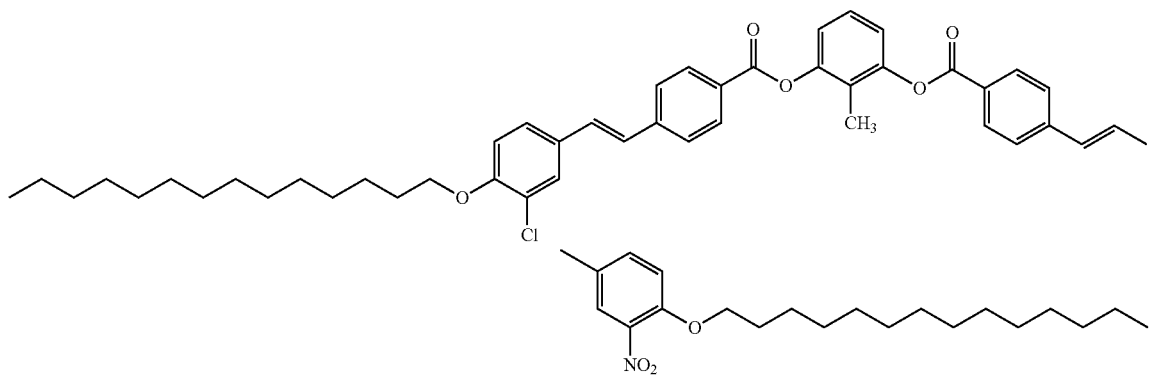

The flexo-electric panel 420 is similar to the flexo-electric panel 400 shown in FIG. 26 in that a horizontal electric field is applied to an n-type liquid crystal. In the flexo-electric panel 420, dipole moments p of the liquid crystal molecules 424*a* are randomly oriented initially, and the liquid crystal molecules will not exhibit bend orientation. Therefore, the flexo-electric panel 420 also differs from the TEA mode in orientation states of liquid crystal molecules to which no electric field is applied and to which an electric field is applied. Further, the flexo-electric panel 420, in which the dipole moments μ of the liquid crystal molecules 424*a* are randomly oriented initially, carries out a display by utilizing the flexo-electric effect by applying a horizontal electric field so that the dipole moments μ become oriented in a single direction. On this point, the flexo-electric panel 420 differs from the TBA mode in operation mechanism.

Further, such a banana-shaped liquid crystal as described above is generally large in molecular size, exhibits a liquid crystal phase in a high temperature range, and requires a high driving voltage. Therefore, there has been no such a practical material that can realize the flexo-electric panel 420.

As a driving mode in which a vertical electric field is applied to an n-type liquid crystal, there has been a slippy surface mode, commonly called a slippy mode, in which a vertical electric field is applied to an n-type liquid crystal that is horizontally oriented (see Patent Literature 2).

An operation mechanism of a liquid crystal panel (slippy panel) adopting the slippy mode is described below.

Figure 29:
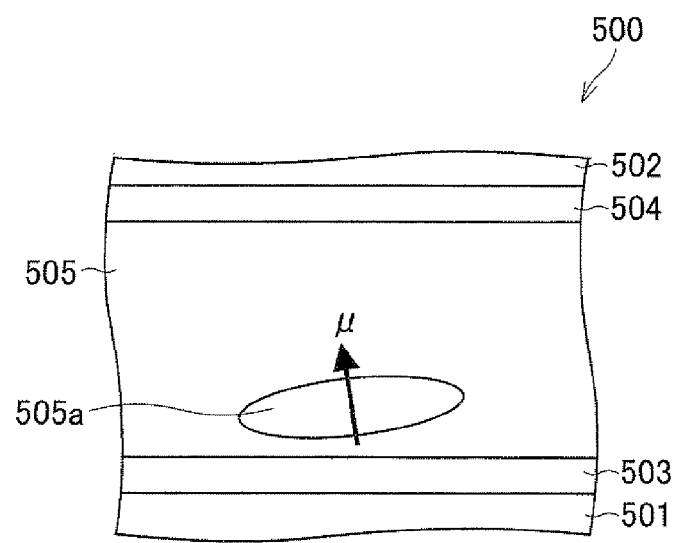
FIG. 29 is a cross-sectional view schematically illustrating an arrangement of a slippy panel which carries out a display with a slippy mode.
Figure 30:
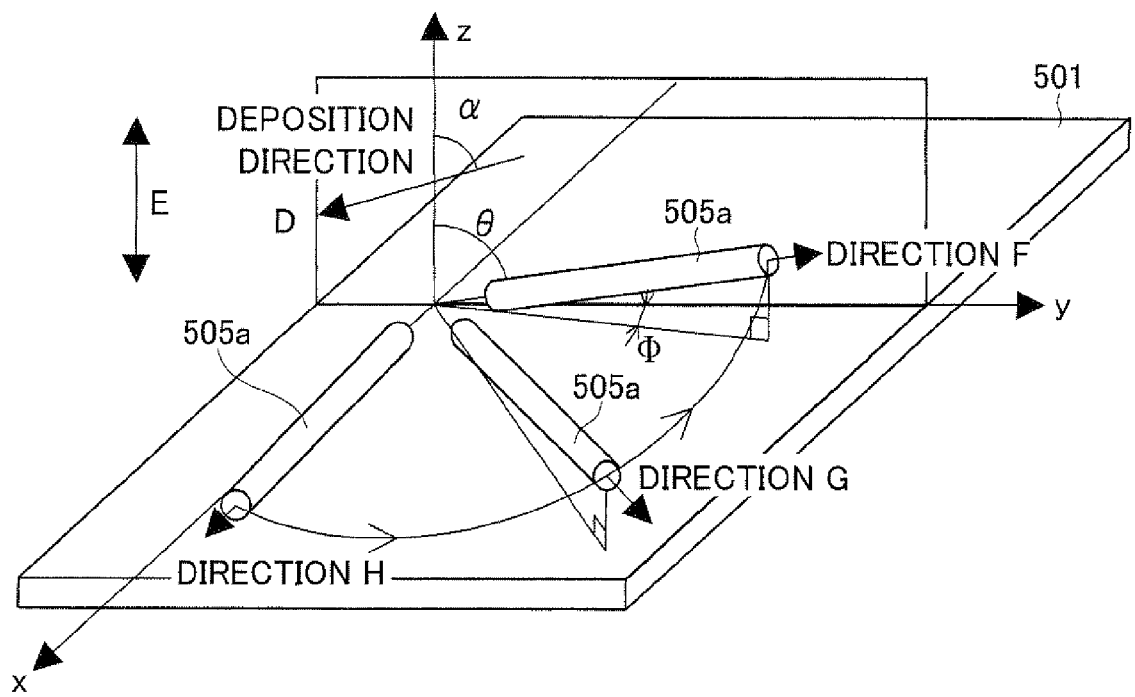
FIG. 30 is a perspective view schematically illustrating an arrangement of a main part of the slippy panel shown in FIG. 29.

FIG. 29 is a cross-sectional view schematically illustrating an arrangement of a slippy panel for displaying with a slippy mode. FIG. 30 is a perspective view schematically illustrating an arrangement of a main part of the slippy panel shown in FIG. 29.

As shown in FIG. 29, a slippy panel 500 for displaying with a slippy mode uses an n-type liquid crystal as a liquid crystal material and includes (i) a substrate 501 including an alignment film (not shown) formed by oblique deposition of $SiO_2$, (ii) a substrate 502 facing the substrate 501, (iii) a liquid crystal layer 505 sandwiched between the substrates 501 and 502, and (iv) electrodes 503 and 504 provided on the substrates 501 and 502, respectively. The slippy panel 500 carries out a display by rotating liquid crystal molecules 505*a* in a plane parallel to a substrate plane by applying a vertical electric field that is perpendicular to the substrate plane.

As shown in FIG. 30, it is well known that, in a case where an alignment film (not shown) is formed by obliquely depositing silicon oxide ($SiO_x$) onto the substrate 501, an alignment direction of the liquid crystal molecules 505*a* changes according to a deposition angle α (angle between a normal line of the substrate and a deposition direction indicated by the arrow D). The liquid crystal molecules 505*a* are aligned perpendicularly to the deposition direction in case of a small deposition angle α c and are aligned parallel to the deposition direction in case of a large deposition angle α. In a case where the deposition angle α is approximately 75 degrees, there is a small difference in energy between these two alignments. This means that, with the deposition angle α in a certain range around 75 degrees, either alignment can be generated according to a small difference in condition. With such a deposition angle α, the alignment direction of the liquid crystal molecules 505*a* continuously (reversibly) changes between one parallel to the deposition direction and one perpendicular to the deposition angle in response to a change in surrounding temperature or voltage application, for example.

In a case where $SiO_2$ is obliquely deposited at a deposition angle α of approximately 75 degrees, the liquid crystal molecules 505*a* are aligned substantially parallel to the deposition direction and inclined at a certain angle (tilt angle Φ) (direction F) at a low temperature, and are aligned perpendicularly to the deposition direction (orientation H) and inclined at a tilt angle of approximately 0 degree when the temperature is increased. Application of a vertical electric field to the liquid crystal layer 505 (see FIG. 29) described above causes the orientation direction of the liquid crystal molecules 505*a* to continuously shift from the x direction to the y direction according to intensity of an applied electric field (direction F→direction G→direction H). If the liquid crystal molecule material is a p-type liquid crystal, liquid crystal molecules rise in the z direction (the tilt angle Φ becomes large) in sync with the change in orientation direction of the liquid crystal molecules. This causes reduction in luminance.

In view of this, the invention of Patent Literature 2 uses an n-type liquid crystal for the purpose of preventing generation and increase of dielectric energy so that the liquid crystal molecules 505*a* do not rise in the Z direction.

The slippy mode is a mode in which liquid crystal molecules rotate on a plane parallel to a substrate plane when a voltage is vertically applied. The invention of Patent Literature 2 is characterized in that an n-type liquid crystal, which does not respond to an applied electric field E, is used for the purpose of preventing luminance reduction caused by rising of liquid crystal molecules.

However, with the slippy mode, it is necessary to increase a temperature of the liquid crystal layer 505 so as to align the liquid crystal molecules 505*a* in the direction H in advance. Therefore, the slippy mode cannot be regarded as practical.

As is understood by the above explanations, the slippy mode also differs from the TBA mode in operation mechanism and in orientation states of the liquid crystal molecules 505a to which no electric field is applied and to which an electric field is applied.

As described above, the TBA mode is totally different from various known driving systems in operation mechanism (display principle) and in arrangement. The various known driving systems described above cannot achieve a wide viewing angle equivalent to the IPS mode and a high-speed response like the OCB mode or exceeding the OCB mode at the same time.

Techniques for generating bend orientation have been studied mainly in regard to how to perform uniform orientation conversion to the bend orientation in a large area within a short period of time. For example, the following approaches have been made: (1) increasing a pretilt angle; (2) decreasing elastic constant of a liquid crystal; (3) applying a high voltage for an initial operation for orientation conversion; (4) causing a part of an alignment film in a pixel to exhibit vertical orientation; (5) stabilizing or assisting bend orientation with the use of a liquid crystal-polymer complex; (6) providing a protrusion or a column on a part of an alignment film in a pixel; and (7) using a 180°-twist cell. However, there has been no such an approach for generating bend orientation without an orientation conversion operation.

All of current liquid crystal display devices use an alternating electric field except for those adopting the flexo-electric mode. Further, all of current liquid crystal display devices in practical use carry out a driving with the use of the alternating electric field, and as described above, a direction of an applied electric field E is generally arranged so as to differ from a direction of dipole moment μ of a liquid crystal to which no voltage is applied. The TBA mode is beyond such a common practice, and is an entirely new driving system (display mode) that carries out a display by applying an electric field E in the same direction as a dipole moment μ of a liquid crystal to which no voltage is applied.

An arrangement of the liquid crystal panel 10 used in the present embodiment and a production method thereof are described below in detail. In addition, an effect of the liquid crystal panel 10 is described with reference to Comparative Examples 1 and 2. Note however that Examples 1 and 2 described below are mere examples of arrangement and production method of the liquid crystal panel 10 shown in FIGS. 1 and 2, and the present embodiment is not limited to these. In Comparative Examples 1 and 2, components similar to those in the liquid crystal panel 10 are labeled with the same reference numerals as in the liquid crystal panel 10 for the purpose of easy comparison.

Example 1

In Example 1, 5 wt. % NMP (N-methyl-2-pyrrolidone) solution of an alignment film coat material "SE-7492" (product name, NISSAN CHEMICAL INDUSTRIES, LTD.) was applied by a spin-coating method to a glass substrate 6 on which interleave electrodes 8 and 9 made of aluminium were provided. Each of the interleave electrodes 8 and 9 had a width of 4 μm, a thickness of 0.4 μm, and an electrode interval of 4 μm. Then, the substrate 6 was subjected to curing for 2 hours at 250° C., so that a substrate 1 was produced. An alignment film 11 thus formed had a thickness of 600 Å (60 nm).

An alignment film 12 was formed in the same way as the alignment film 11 on a glass substrate 7 that was same in size and material as the substrate 6, so that a substrate 2 was produced.

Then, an alignment process was applied, with the use of nonwoven nylon cloth, to the substrates 1 and 2 in directions indicated by arrows A and B, respectively, as shown in FIGS. 1 and 2.

Next, resin beads "Micropearl SP" (product name, SEKISUI CHEMICAL CO., LTD.) each having a diameter of 5.5 μm were dispersed on the substrate 1 as spacers 13. At the same time, sealing resin "STRUCTBOND XN-21-S" (product name, MITSUI CHEMICALS, INC.) was printed on the substrate 2. The substrates 1 and 2 were attached to each other, and then heated for 3 hours at 250° C. In this way, a liquid crystal cell 15 was produced.

Then, "SD-5544XX" (product name, p-type nematic liquid crystal material made by CHISSO CORPORATION) was filled in the liquid crystal cell 15 as a liquid crystal material by vacuum injection. Polarizing plates 4 and 5 were respectively attached to front and back surfaces of the liquid crystal cell 15. In this way, a liquid crystal panel 10 shown in FIG. 1 was produced.

FIG. 3 shows a relation between directions of the alignment process and respective axial directions of the polarizing plates 4 and 5. It was arranged so that the respective transmission axis directions of the polarizing plates 4 and 5, indicated by arrows 4a and 5a, respectively, cross each other at a right angle, and cross at 45 degrees each direction of rubbing applied to the alignment films 11 and 12, which are respectively provided on the substrates 1 and 2 that are adjacent to the polarizing plates 4 and 5, respectively, in other words, cross at 45 degrees each direction of rubbing applied to a light incident side (lower side, that is, a side toward a backlight unit (not shown)) and a light emitting side (display surface side).

Figure 8:
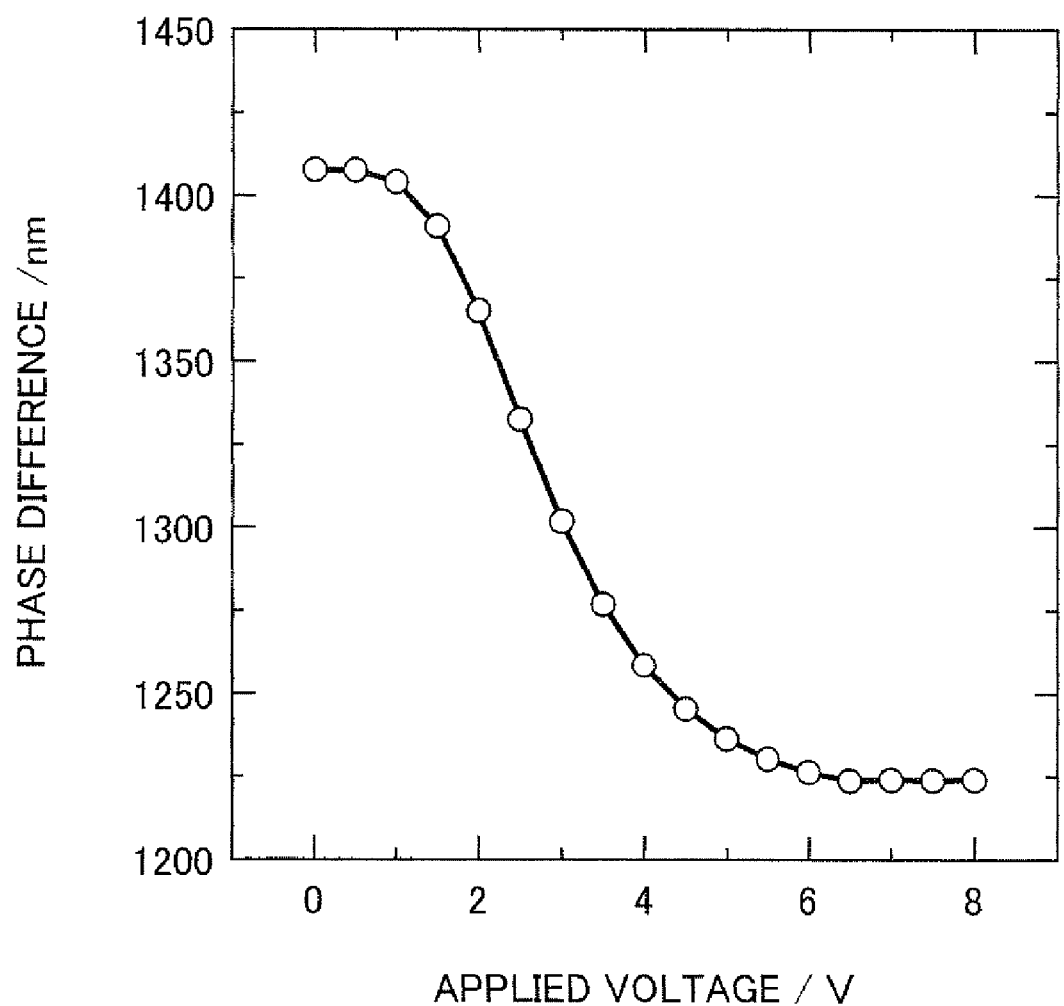
FIG. 8 is a graph showing a voltage-phase difference characteristic of the liquid crystal panel shown in FIG. 2, which is measured with light of SS0 nm wavelength.

In regard to the liquid crystal panel 10 thus produced, FIG. 8 shows a relation between an applied voltage and a phase difference of a liquid crystal layer 3 (voltage-phase difference characteristic) measured at 550 nm wavelength.

FIG. 8 indicates that application of a voltage of 7V to the liquid crystal panel 10 causes a change of 184 nm in phase difference.

Figure 9:
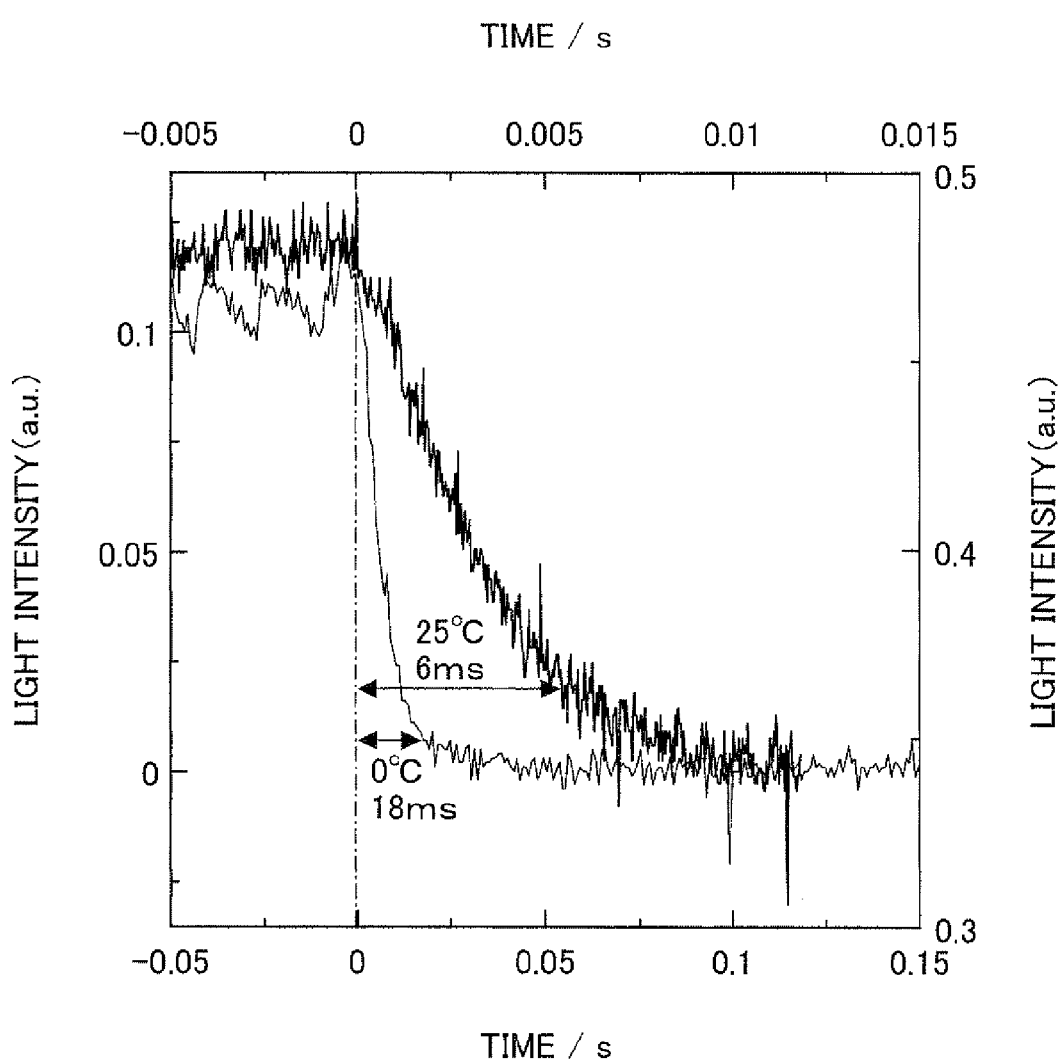
FIG. 9 is a graph showing optical response waveforms of the liquid crystal panel shown in FIG. 2, which are obtained at 0° C. and 25° C., respectively, when an applied voltage is changed from 1V to 0V.

FIG. 9 shows optical response waveforms indicating a relation between light intensity and elapsed time (response time), which waveforms are obtained at 0° C. and 25° C., respectively, when an applied voltage is changed from 1V to 0V. This measurement was carried out by a standard method known in the art, in which response time is defined as time required for 90% of change in intensity of transmitted light when the applied voltage is changed.

As is apparent from FIG. 9, the liquid crystal panel 10 exhibited a high-speed response even at 0° C., and therefore can be considered as large in practical value.

In a liquid crystal display device, at the time of rising, it is easy to apparently achieve a high-speed response by applying a voltage larger than a certain voltage as in an overdrive system. On the other hand, at the time of falling, the response time depends on only what is used as a liquid crystal material and how a panel is arranged, and therefore it is important to use a liquid crystal material having a low viscosity or to arrange the panel in such a way that a high-speed response can be achieved. In the liquid crystal panel 10, the liquid crystal layer 3 exhibits bend orientation (bend alignment), so that flow in a liquid crystal does not retard the response characteristics. This allows the liquid crystal panel 10 to achieve a high-speed response.

The bend orientation itself is utilized in a liquid crystal display device adopting an OCB mode. However, in the OCB mode, it is necessary to carry out an operation for orientation conversion from an initial splay orientation to the bend orientation for every power-on operation. The OCB mode has been requested for improvement on this point. In contrast, in a liquid crystal display device including the liquid crystal panel 10, which is a TBA-mode type liquid crystal panel, it is unnecessary to provide a circuit for converting an initial orientation, and it is possible to prevent failure of the conversion caused at the time of a low-temperature operation.

Comparative Example 1

Figure 10:
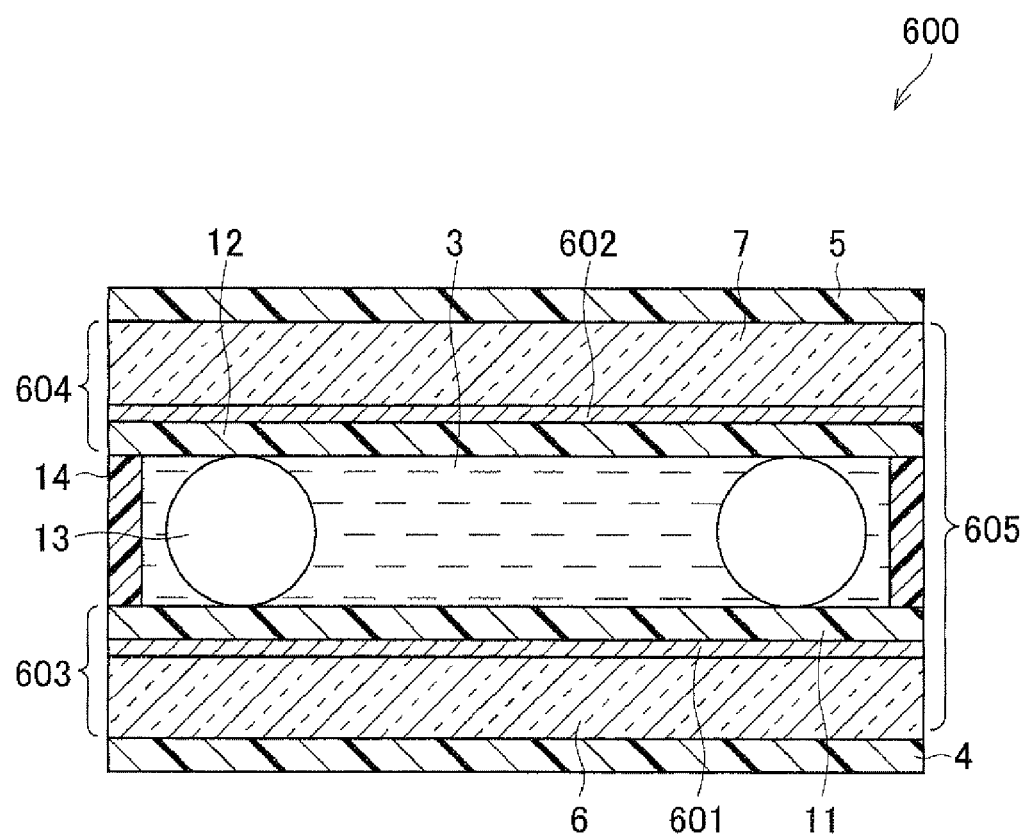
FIG. 10 is a cross-sectional view schematically illustrating an arrangement of a liquid crystal panel produced in Comparative Example 1.

FIG. 10 schematically illustrates a cross-sectional arrangement of a liquid crystal panel produced in Comparative Example 1. In the present comparative example, a comparative liquid crystal panel 600 was produced and driven by the same method and under the same conditions as in Example 1, except that (i) flat electrodes 601 and 602 (0.1 μm thickness) are provided instead of interleave electrodes 8 and 9 on surfaces of glass substrates 6 and 7, respectively, which surfaces face each other, so as to cover whole area of the surfaces as shown in FIG. 10; (ii) a vertical electric field is applied to a liquid crystal layer 3 in a direction perpendicular to a substrate plane after alignment films 11 and 12 are subjected to an alignment process so as to have alignment in certain directions, respectively.

Specifically, in the present comparative example, 5 wt. % NMP solution of an alignment film coat material "SE-7492" (NISSAN CHEMICAL INDUSTRIES, LTD.) was applied by a spin-coating method in the same way as in Example 1 to the ITO electrodes 601 and 602 that are formed on the glass substrates 6 and 7, respectively. Then, the substrates were heated for 2 hours at 250° C. In this way, substrates 603 and 604 for comparison were produced. The alignment films 11 and 12 thus formed had a thickness of 600 Å as in Example 1.

Then, the substrates 603 and 604 were subjected to an alignment process with the use of nonwoven nylon cloth so as to have alignment in certain directions, respectively.

Next, resin beads "Mieropearl SP" each having a diameter of 5.5 μm were dispersed on the substrate 603 as spacers 13 under the same conditions as in Example 1. At the same time, sealing resin "STRUCTBOND XN-21-S" was printed on the substrate 604 in the same way as in Example 1. Then, the substrates 603 and 604 were attached to each other, and thereafter heated for 3 hours at 2500C. In this way, a liquid crystal cell 605 was produced.

The liquid crystal cell 605 was filled with "SD-5544XX", which is a liquid crystal material, by vacuum injection under the same conditions as in Example 1. Then, polarizing plates 4 and 5 were attached to front and back surfaces of the liquid crystal cell 605, respectively. In this way, the comparative liquid crystal panel 600 shown in FIG. 10 was produced, A relation between directions of the alignment process applied respectively to the alignment films 11 and 12 and respective axial directions of polarizing plates 4 and 5 is the same as one shown in FIG. 3 in Example 1. It was arranged so that the respective transmission axis directions of the polarizing plates 4 and 5, indicated by arrows 4a and 5a, respectively, cross each other at a right angle, and cross at 45 degrees each direction of rubbing applied to the alignment films 11 and 12, which are respectively provided on the substrates 1 and 2 that are adjacent to the polarizing plates 4 and 5, respectively, in other words, cross at 45 degrees each direction of rubbing applied to a light incident side (lower side, that is, side toward a backlight unit (not shown)) and a light emitting side (display surface side).

Figure 11:
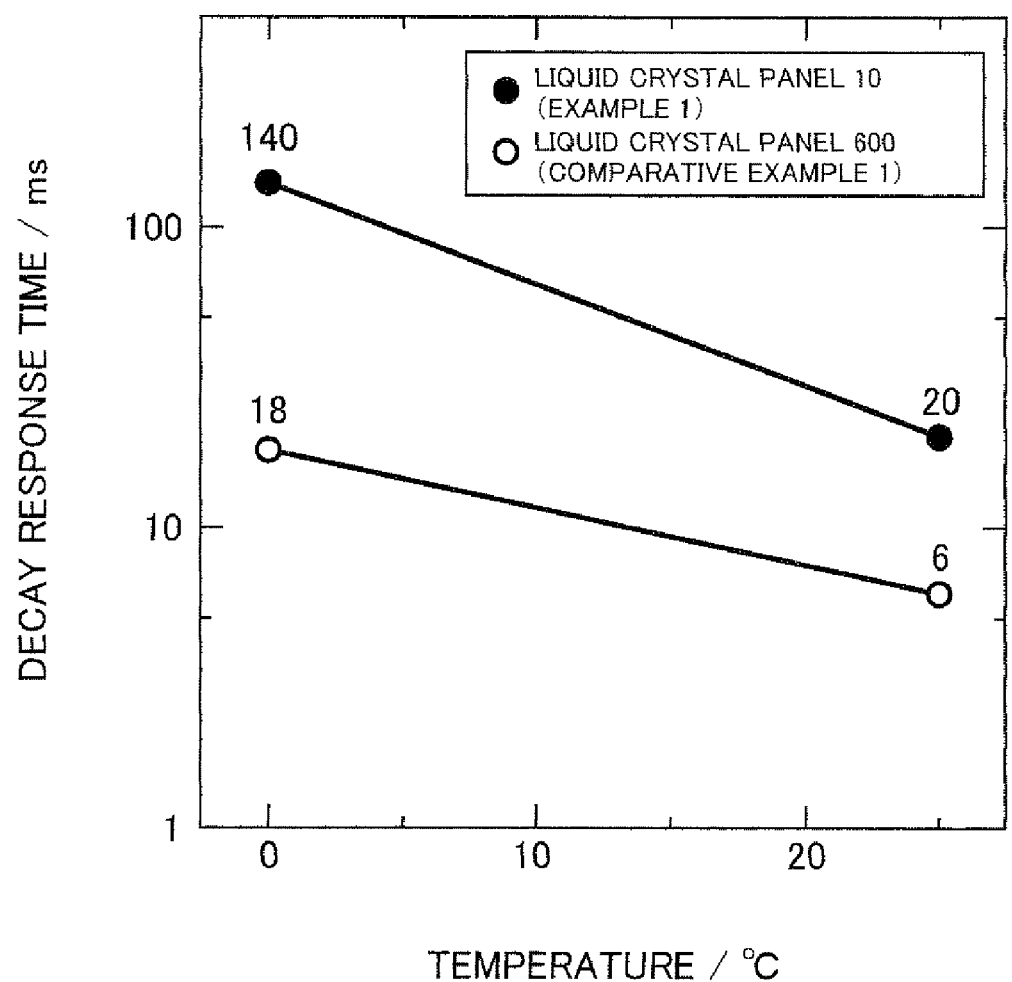
FIG. 11 is a graph showing a relation between a driving temperature and a decay response time of respective liquid crystal panels produced in Example 1 and Comparative Example 1.
Figure 12:
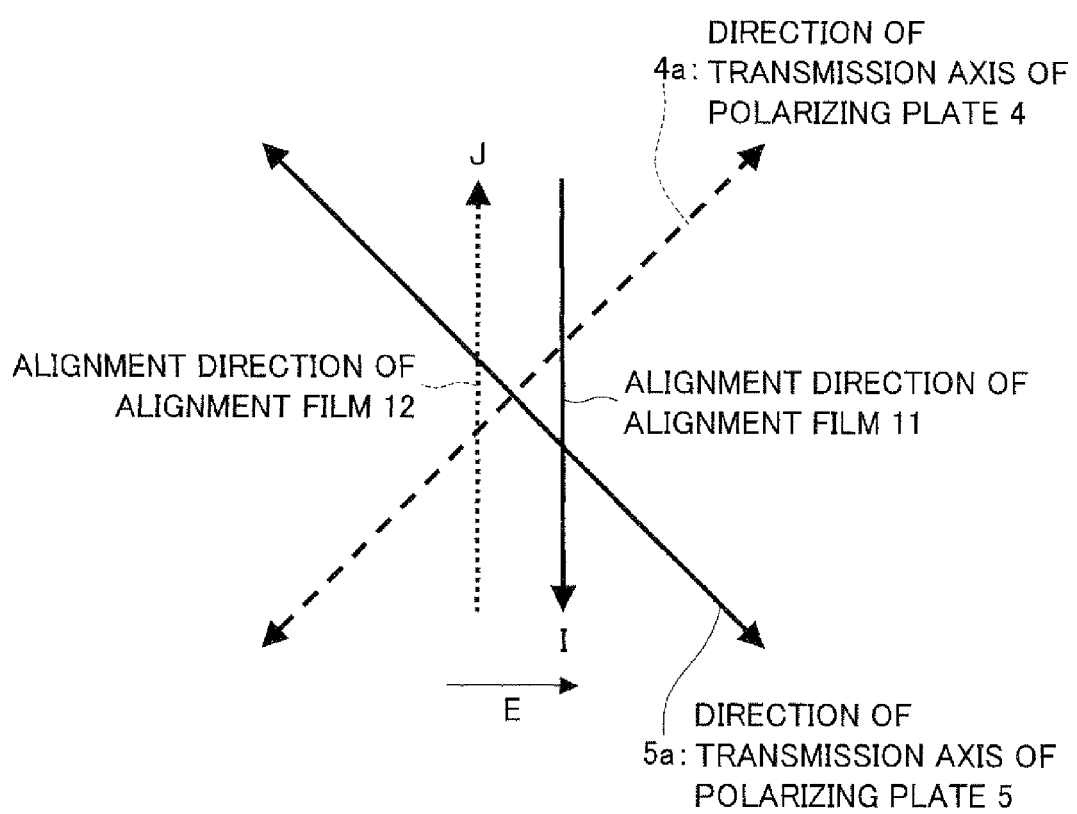
FIG. 12 is a view illustrating a relation among alignment films, directions of alignment process, and directions of respective transmission axes of polarizing plates in a liquid crystal panel produced in Comparative Example 2.

The liquid crystal panel 600 adopts a so-called ECB (Electrically Controlled Birefringence) mode. The liquid crystal panel 600 was subjected to a measurement of decay response time where an applied voltage is changed from 1V to 0V as in Example 1. The response time at 0° C. and 25° C. was 140 ms and 20 ms, respectively. FIG. 11 shows a result of comparison between the liquid crystal panel 600 and the liquid crystal panel 10 of Example 1 in regard to a relation of driving temperature (environmental temperature) to decay response time.

Comparative Example 2

A comparative liquid crystal panel was produced in the same way as in Example 1, except that directions I and J of alignment process applied to alignment films 11 and 12, respectively, were arranged orthogonally to a direction of an applied electric field E so that a direction of dipole moments p of liquid crystal molecules 3a becomes orthogonal to the direction of the applied electric field E. The comparative liquid crystal panel was subjected to a measurement of response time where an applied voltage was changed from 1V to 0 V as in Example 1. The response time of the comparative liquid crystal panel at 0° C. and 25° C. was 300 ms and 32 ms, respectively.

As is apparent from FIG. 11 and comparison between Example 1 and Comparative Example 2, the liquid crystal panel 10 is excellent in optical response property at a low temperature and therefore is large in practical value.

Example 2

Figure 13:
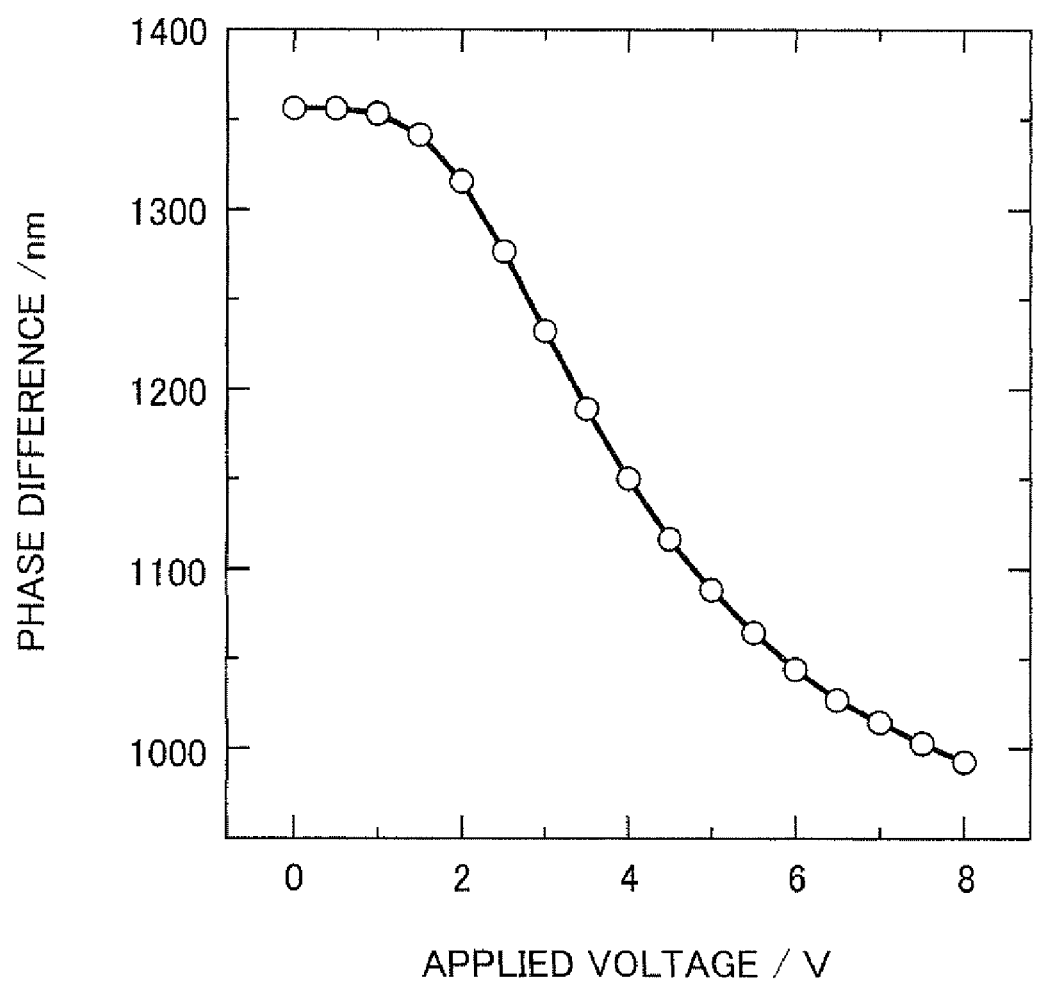
FIG. 13 is a graph showing a voltage-phase difference characteristic of a liquid crystal panel produced in Example 2.

A liquid crystal panel 10 was produced in the same way as in Example 1, except that ITO electrodes were used as interleave electrodes 8 and 9. The liquid crystal panel 10 was subjected to a measurement of voltage-phase difference characteristic by the same method as in Example 1. FIG. 13 shows a result thereof. When the liquid crystal panel 10 was driven with a voltage within a range from 0V to 7V, a phase difference in a liquid crystal layer 3 of the liquid crystal panel 10 of Example 1 was 184 nm, whereas that in a liquid crystal layer 3 of the liquid crystal panel 10 of Example 2 was 341 nm.

A wide range of adjustment in phase difference allows a reduction in driving voltage, and therefore is greatly important, As is apparent from FIG. 13, the use of ITO as an interleave electrode material achieves a larger phase difference than the use of other materials when a same voltage is applied. As is apparent form FIG. 7, this is because rotation of a director in response to voltage application often occurs above the interleave electrodes 8 and 9, not between the interleave electrodes 8 and 9.

Second Embodiment

Another embodiment of the present invention is described below mainly with reference to FIGS. 14 through 18. Descriptions in the present embodiment deal with only differences with First Embodiment. In the present embodiment, components having a similar function to those in First Embodiment are labeled with the same reference numerals, and explanations of the components are omitted.

Figure 14:
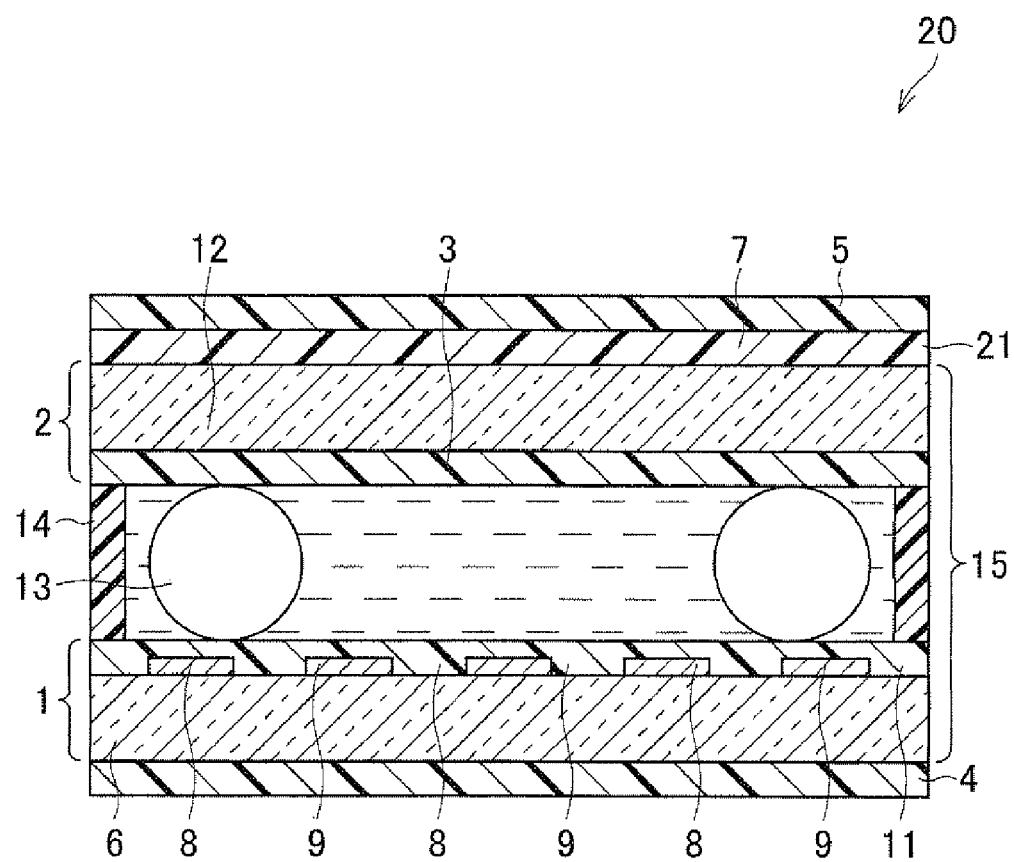
FIG. 14 is a cross-sectional view schematically illustrating an arrangement of a main part of a liquid crystal panel of a liquid crystal display device in accordance with another embodiment of the present invention.

FIG. 14 is a cross-sectional view schematically illustrating an arrangement of a main part of a liquid crystal panel to be provided in a liquid crystal display device in accordance with the present embodiment. In the present embodiment, a substrate on a display surface side (observer side) is referred to as an upper substrate, and a substrate facing the upper substrate is referred to as a lower substrate.

As shown in FIG. 14, a liquid crystal panel 20 in accordance with the present embodiment includes a phase difference film 21 (phase plate) between an upper substrate 2 and a polarizing plate 5, in addition to components of the liquid crystal panel 10 of First Embodiment.

In order to attain a wide viewing angle, it is necessary to compensate both of phase difference in a liquid crystal layer and viewing angle dependency of a crossing angle of polarizing plates.

In the present embodiment, compensation of phase difference in the liquid crystal layer means compensation of uniaxiality (positive uniaxiality) of the liquid crystal material exhibiting horizontal orientation. The compensation can be completely done by providing a negative A plate (compensation layer) in a direction parallel to a direction of alignment process applied to the liquid crystal material.

The following equation indicates an optical characteristic of a liquid crystal layer 3 that exhibits positive uniaxiality.

$$\frac{a^2}{x^2} + \frac{b^2}{y^2} + \frac{b^2}{z^2} = 1 \qquad \text{Math. 4}$$

The following equation indicates an optical characteristic of the negative A plate.

$$\frac{b^2}{x^2} + \frac{a^2}{y^2} + \frac{a^2}{z^2} = 1 \qquad \text{Math. 5}$$

The following equation is obtained by adding Math. 4 to Math. 5.

$$\frac{a^2 + b^2}{x^2} + \frac{a^2 + b^2}{y^2} + \frac{a^2 + b^2}{z^2} = 2 \qquad \text{Math. 6}$$

Math. 6 indicates a state that a refractive index ellipsoid of the liquid crystal layer is a perfect sphere. This means that the liquid crystal layer 3 can be seen in a single way from any direction, that is to say, the viewing angle dependency of the liquid crystal layer 3 is completely eliminated.

The negative A plate is a phase plate characterized by nx<ny=nz (nx and ny indicate refractive index in x and y directions, respectively, in a film plane, and nz indicates a refractive index in a thickness direction of the film plane). For example, a phase difference film made of polystyrene has such a characteristic.

The viewing angle dependency of the crossing angle of the polarizing plates can be compensated with a positive uniaxial film (positive A plate characterized by nx>ny=nz) and a positive C plate characterized by nx=ny<nz.

According to a calculation, the widest viewing angle can be attained when phase differences of the positive uniaxial film and the positive C plate are 140 nm and 95 nm, respectively.

Figure 15:
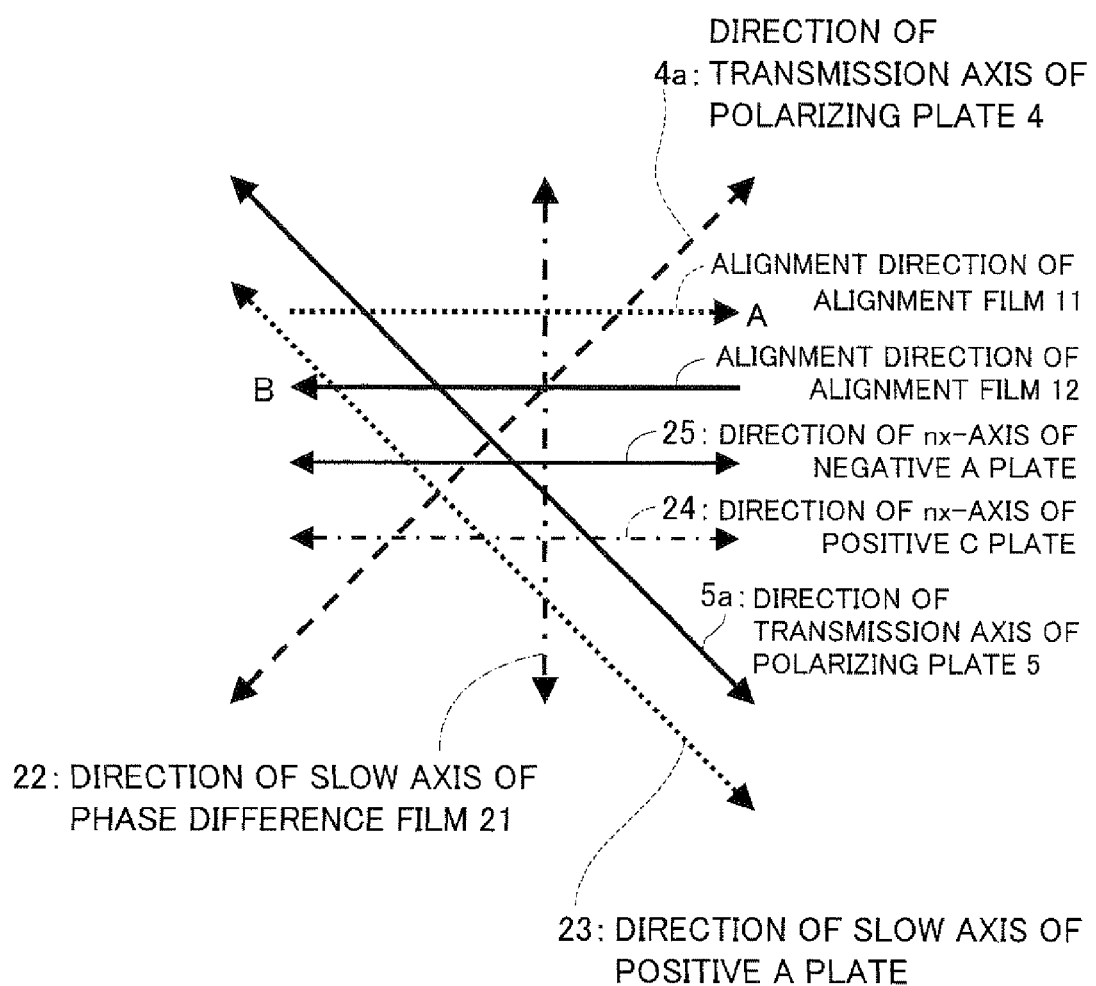
FIG. 15 is a view illustrating a relation among axial directions of a phase difference film, directions of respective transmission axes of polarizing plates, and directions of alignment process in the liquid crystal panel shown in FIG. 14.
Figure 16:
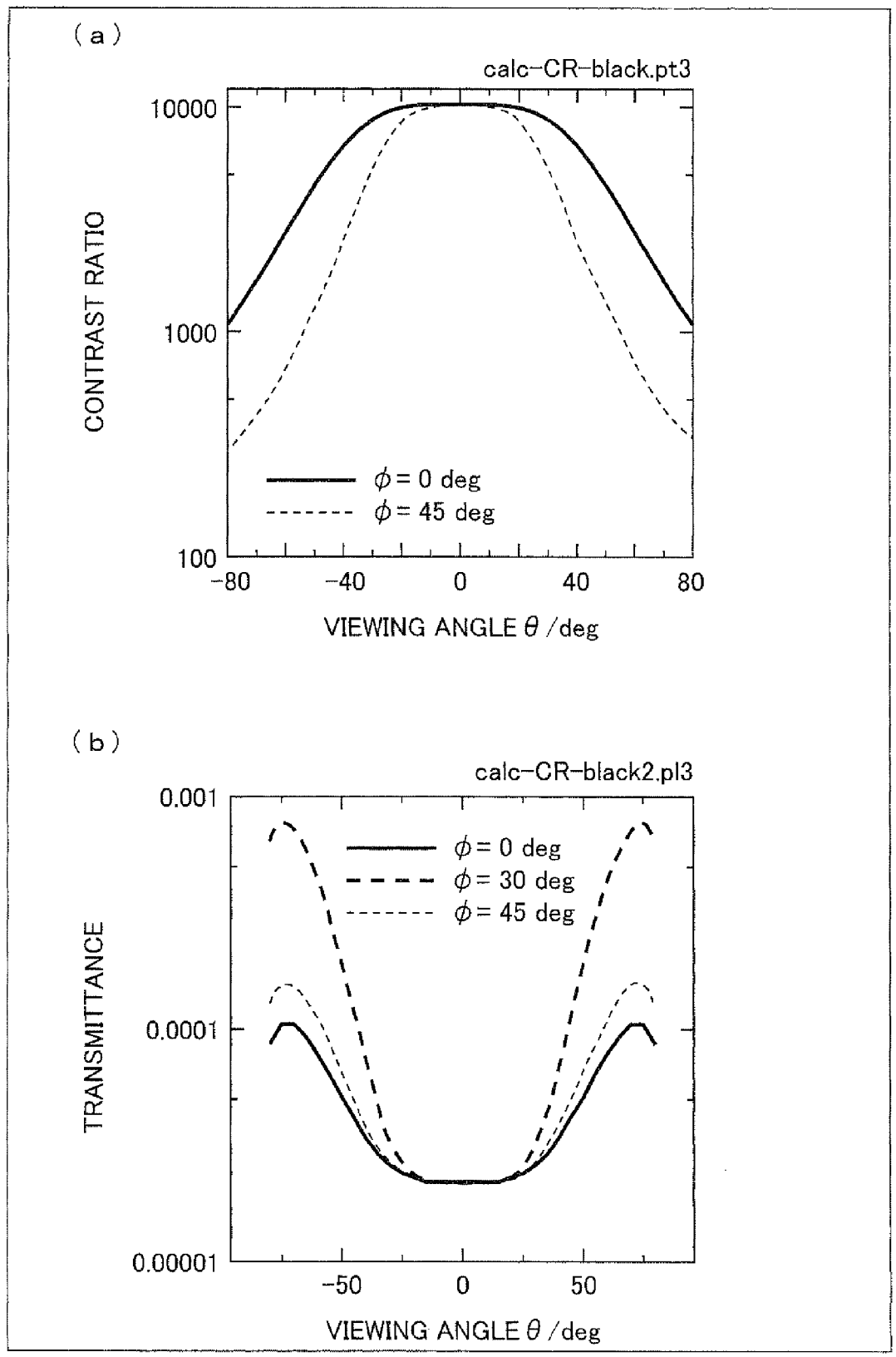
FIG. 16 Shown in (a) and (b) of FIG. 16 is a viewing angle characteristic of an optimally arranged liquid crystal panel shown in FIG. 14, which characteristic is found by a calculation. In (a), a graph showing a relation between a contrast ratio and a viewing angle with respect to a front direction of the panel is shown. In (b), a graph showing a relation between transmittance and a viewing angle with respect to the front direction of the panel is shown.

In the present embodiment, a phase difference film 21 was made of lamination of the negative A plate, the positive C plate, and the positive uniaxial film (positive A plate). It was arranged so that, as shown in FIG. 15, a slow axis direction of the positive uniaxial film (positive A plate) indicated by an arrow 22 corresponded to a transmission axis (polarizing axis) direction of a polarizing plate 5 indicated by an arrow 5a, which polarizing plate 5 is provided adjacent to the phase difference film 21, and that the phase difference film 21 was provided between the polarizing plate 5 and a substrate 2 that is provided adjacent to the polarizing plate 5. Further, it was arranged so that the phase differences of the positive uniaxial film and the positive C plate were 140 nm and 95 nm, respectively.

FIG. 15 illustrates a relation among a slow axis direction of the phase difference film 21 indicated by the arrow 22, the slow axis direction of the positive A plate indicated by an arrow 23, an nx-axis direction of the positive C plate indicated by an arrow 24, an nx-axis direction of the negative A plate indicated by an arrow 25, a transmission axis direction of a polarizing plate 4 indicated by an arrow 4a, the transmission axis direction of the polarizing plate 4 indicated by the arrow 5a, and directions of alignment processes indicated by arrows A and B, respectively, which processes are applied to an alignment film 11 and an alignment film 12, respectively.

An arrangement and production method of the liquid crystal panel 20 used in the present embodiment is described below in detail. Note however that Example 3 described hereinafter is mere an example of arrangement and production method of the liquid crystal panel 20 shown in FIG. 14, and the present embodiment is not limited to this.

Example 3

In Example 3, 5 wt. % NMP solution of an alignment film coat material "PIX-5400" (product name, NISSAN CHEMICAL INDUSTRIES, LTD.) was applied by a spin-coating method to a glass substrate 6 on which interleave electrodes 8 and 9 made of ITO were provided. Each of the interleave electrodes 8 and 9 had a width of 5 μm, a thickness of 0.4 μm, and an electrode interval of 5 μm. Then, the substrate 6 was heated for 2 hours at 300° C., so that a substrate 1 was produced. An alignment film 11 thus formed had a thickness of 600 Å.

An alignment film 12 was formed, in the same way as the alignment film 11, on a glass substrate 7 that was same in size and material as the substrate 6. In this way, a substrate 2 was produced.

Then, an alignment process was applied, with the use of nonwoven nylon cloth, to the substrates 1 and 2 in directions indicated by arrows A and B, respectively, as shown in FIGS. 1 and 2.

Next, resin beads "Micropearl SP" each having a diameter of 5.5 μm were dispersed on the substrate 1 as spacers 13. At the same time, sealing resin "STRUCTBOND XN-21-S" was printed on the substrate 2. The substrates 1 and 2 were attached to each other, and then subjected to curing for 3 hours at 250° C. In this way, a liquid crystal cell 15 was produced.

Then, "SD-5544XX" was filled in the liquid crystal cell 15 as a liquid crystal material by vacuum injection. A polarizing plate 4 was attached on a back surface side (lower side) of the liquid crystal cell 15, that is, on a surface on an opposite side of the substrate 1 to a surface facing a liquid crystal layer 3. A phase difference film 21 and a polarizing plate 5 were attached in this order on a front surface side (upper side) of the liquid crystal cell 15, that is, on a surface on an opposite side of the substrate 2 to a surface facing the liquid crystal layer 3. In this way, a liquid crystal panel 20 shown in FIG. 14 was produced.

FIG. 15 shows a relation among directions of alignment process, respective axial directions of the polarizing plates 4 and 5, and each axial direction of the phase difference film 21. It was arranged so that directions of respective transmission axes of the polarizing plates 4 and 5, indicated by arrows 4a and 5a, respectively, cross each other at a right angle, and cross at 45 degrees each direction of rubbing applied to the alignment films 11 and 12, which are respectively provided on the substrates 1 and 2 that are adjacent to the polarizing plates 4 and 5, respectively, in other words, cross at 45 degrees each direction of rubbing applied to a light incident side and a light emitting side. Further, the phase difference film 21 was positioned so that (i) a slow axis direction of a positive A plate indicated by the arrow 23 corresponds to the transmission axis (polarizing axis) direction of the polarizing plate 5 indicated by the arrow 5a, which polarizing plate 5 is provided adjacent to the phase difference film 21, and (ii) an nx-axis direction of a positive C plate indicated by an arrow 24 and an nx-axis direction of a negative A plate indicated by an arrow 25 become parallel to directions of rubbing applied to the alignment films 11 and 12, respectively. In this regard, a slow axis direction (indicated by an arrow 22) of the phase difference film 21 crosses, at a right angle, the directions of rubbing respectively applied to the alignment films 11 and 12, and forms 45 degrees with the respective transmission axes of the polarizing plates 4 and 5 indicated by the arrows 4a and 5a, respectively.

FIGS. 16(a) and 16(b) show a viewing angle characteristic that is optimally arranged based on a calculation. FIG. 16(a) is a graph showing a relation between a contrast ratio and a viewing angle with respect to a front direction of a panel. FIG. 16(b) is a graph (vappl.=0) showing a relation between transmittance and a viewing angle with respect to a front direction of a panel. In FIGS. 16(a) and 16(b), a viewing angle (θ, φ) is defined by θ indicating an angle of inclination to a direction of substrate normal line and φ indicating an angle measured counterclockwise from the direction of the alignment process.

Figure 17:
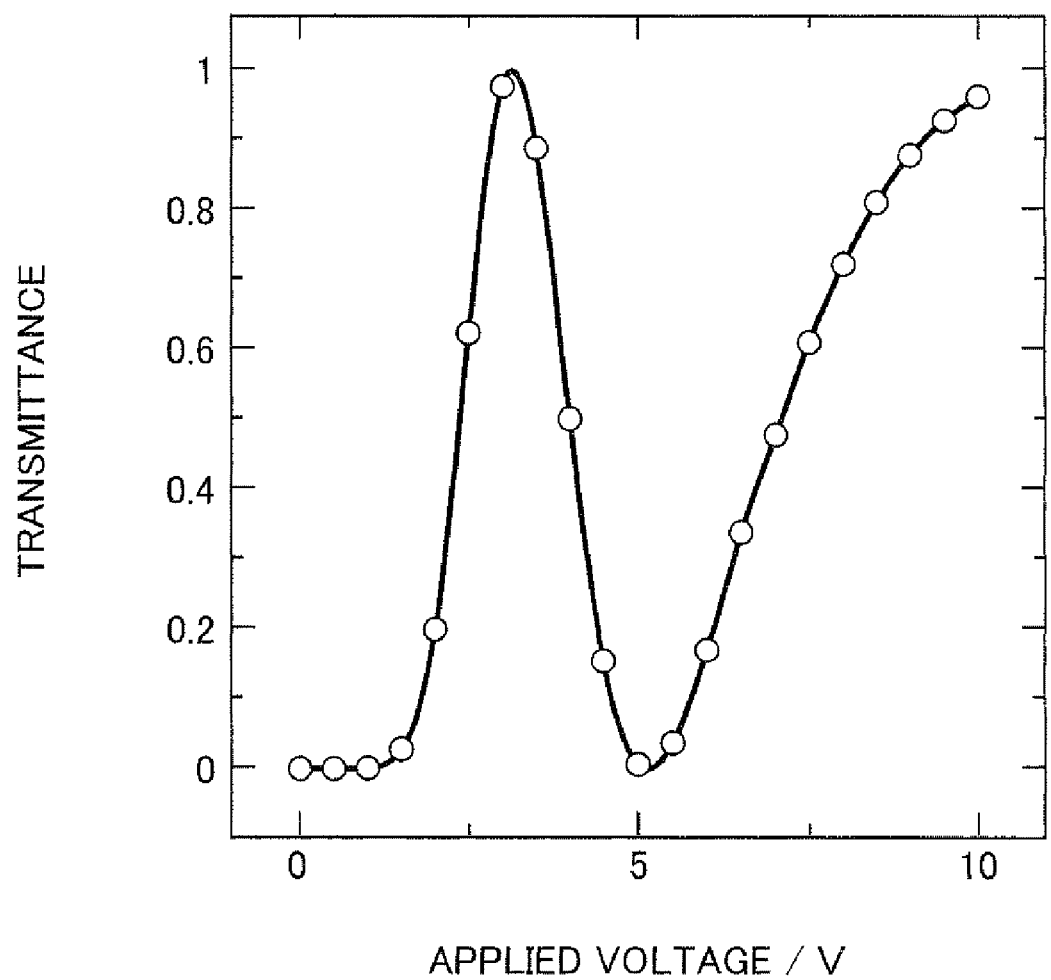
FIG. 17 is a graph showing a voltage-transmittance characteristic of the liquid crystal panel shown in FIG. 14, which is measured with light of 550 nm wavelength.
Figure 18:
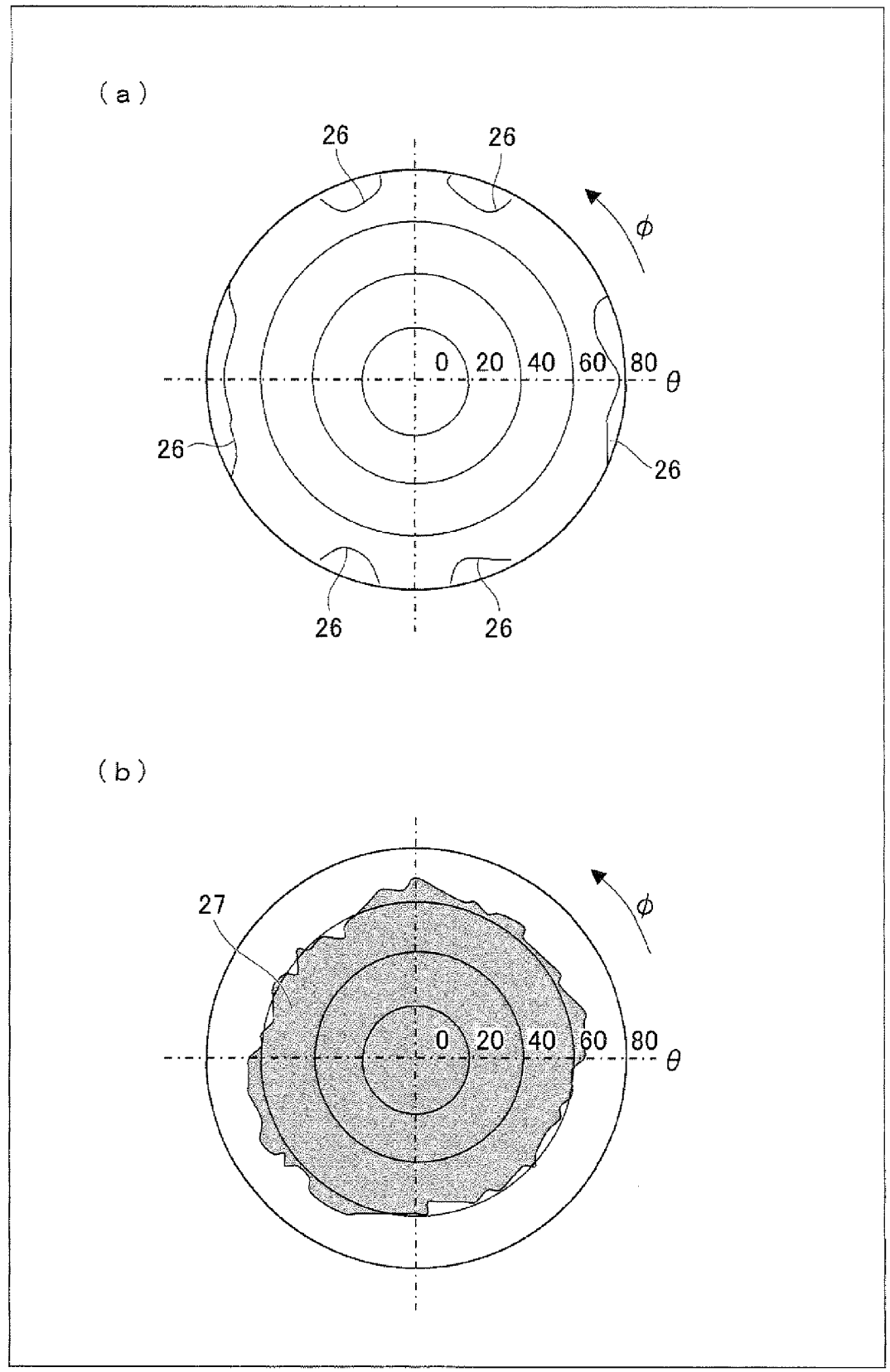
FIG. 18 Shown in (a) is a graph showing a relation between (i) a viewing angle ($\theta$, $\Phi$) with respect to a front direction of the liquid crystal panel shown in FIG. 14 and (ii) an iso-contrast curve indicating a contrast ratio (CR) of 100:1. Shown in (b) is a graph showing a relation between (i) a viewing angle ($\theta$, $\Phi$) with respect to the front direction of the liquid crystal panel shown in FIG. 14 and (ii) a region where $\Delta Cu'v'$ is less than 0.02.
Figure 19:
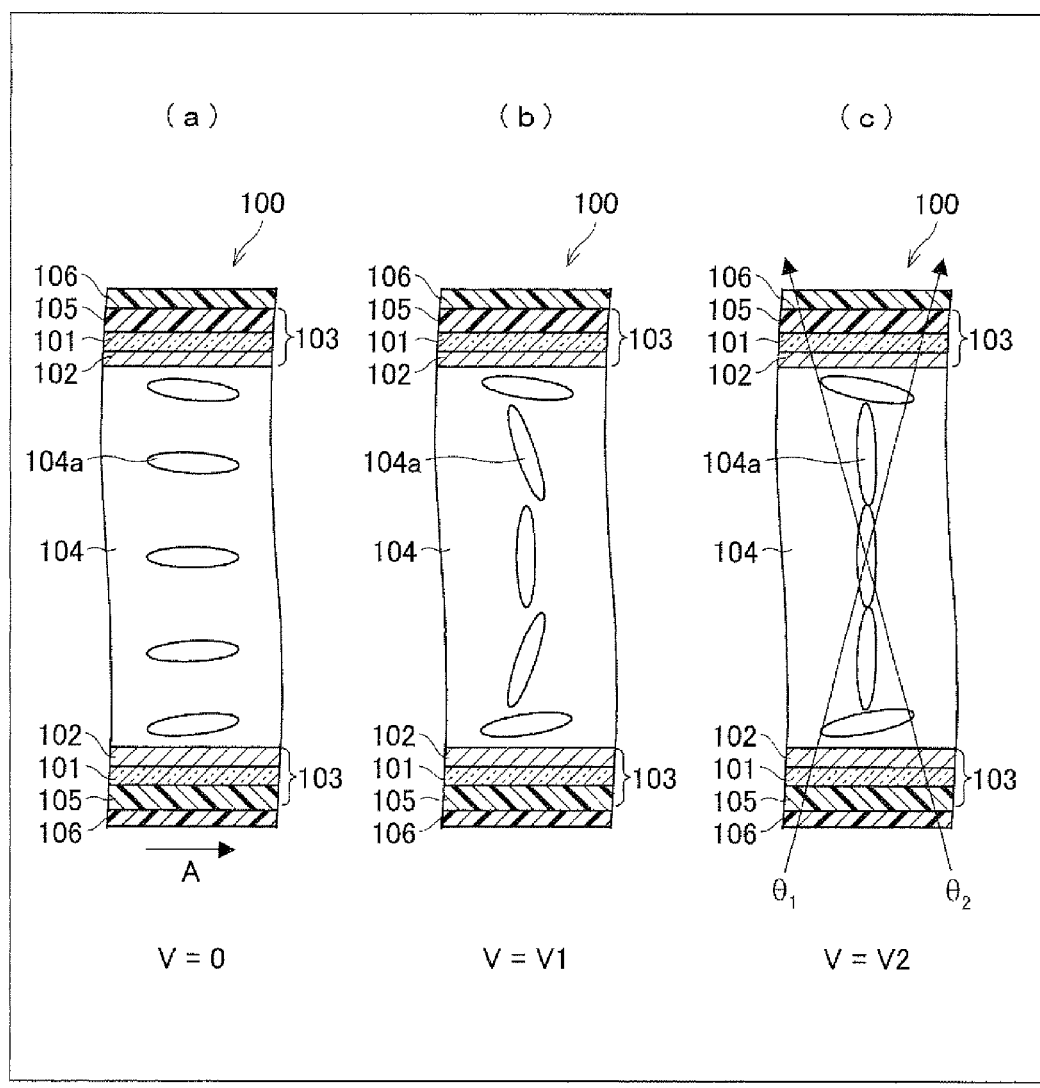
FIG. 19 Each of (a) through (c) is a cross-sectional view schematically illustrating an arrangement of a typical OCB panel which carries out a display with an OCB mode. Shown in (a) is a state of the panel to which no voltage is applied. Shown in (b) is a state of the panel at the time of white display caused by voltage application. Shown in (c) is a state of the panel at the time of black display caused by voltage application.
Figure 20:
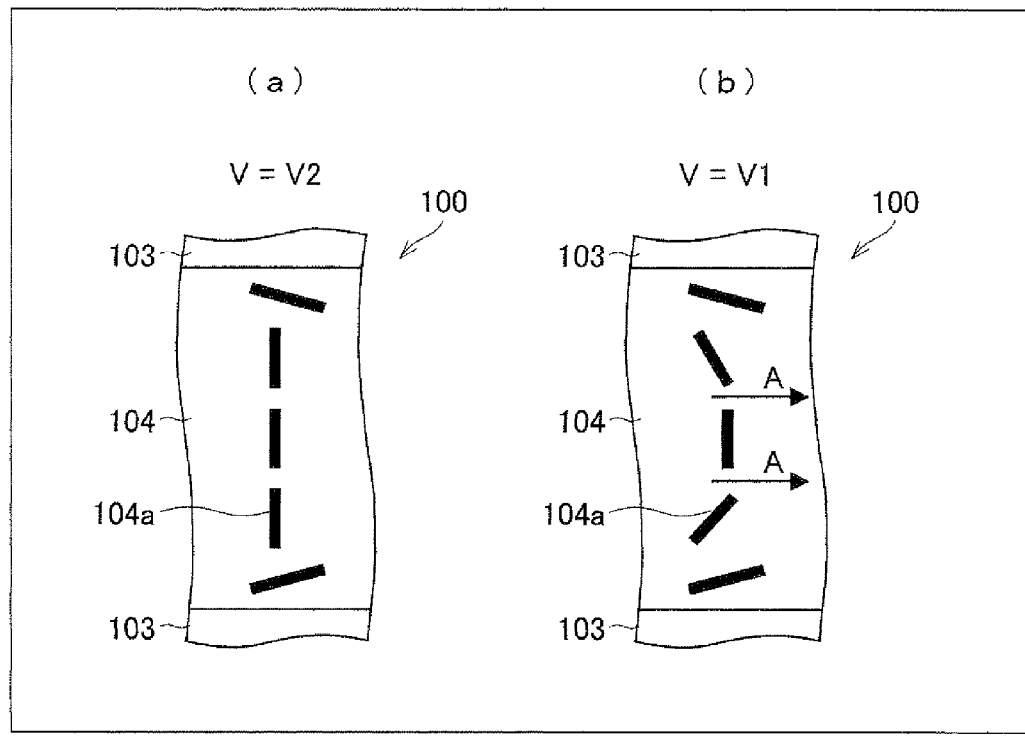
FIG. 20 are cross-sectional views of a main part of the OCB panel shown in (a) through (c) of FIG. 19, which views schematically show a direction of flow in a liquid crystal layer generated at the time of switching from a black display to a white display. In (a), a cross-sectional view of the panel at the time of the black display is shown. In (b), a cross-sectional view of the panel at the time of the white display is shown.
Figure 21:
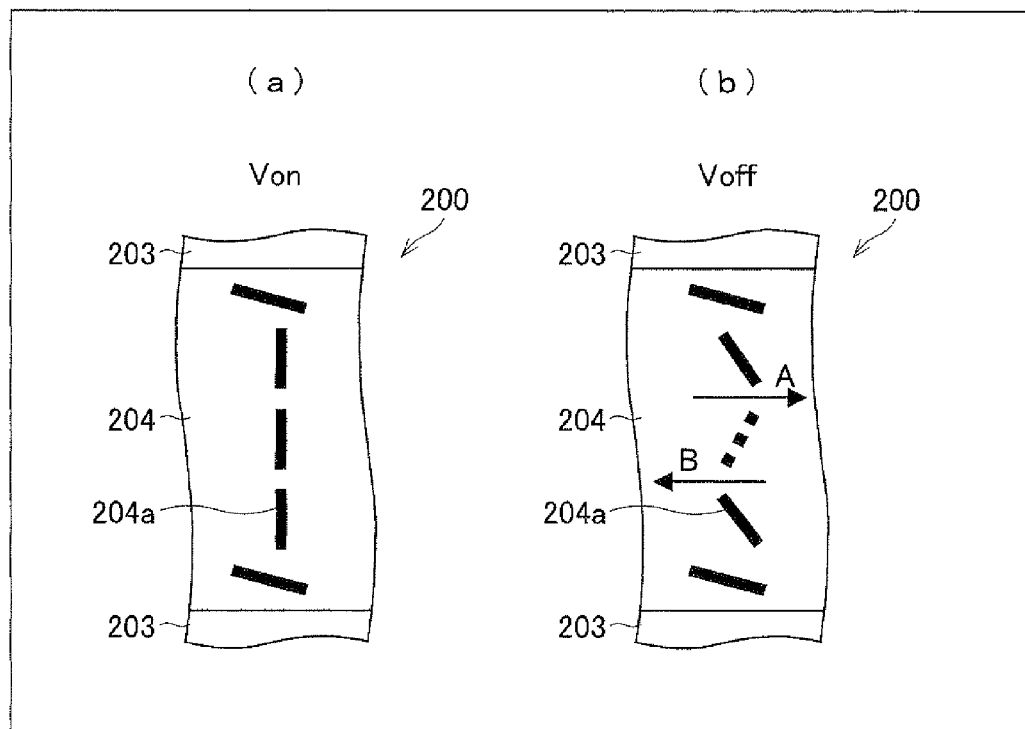
FIG. 21 are cross-sectional views of a main part of a TN panel adopting a TN mode, which views schematically show a direction of flow in a liquid crystal layer generated at the time of switching from a black display to a white display. In (a), a cross-sectional view of the panel at the time of the black display is shown. In (5), a cross-sectional view of the panel at the time of the white display is shown.

FIG. 17 shows a voltage-transmittance characteristic (actual measurement value) of the liquid crystal panel 20 produced as above, which characteristic indicates a relation between an applied voltage and transmittance measured with light of 550 nm wavelength. In this case, a contrast was 1200:1. FIGS. 18(a) and 18(b) show a viewing angle characteristic (actual measurement value) of the liquid crystal panel 20.

FIGS. 18(a) and 18(b) are graphs each showing a change in hue of the liquid crystal panel 20 caused by a change in viewing angle. FIG. 18(a) is a graph showing a relation between (i) a viewing angle (θ, Φ) with respect to a front direction of the liquid crystal panel 20 and (ii) an iso-contrast curve 26 indicating a contrast ratio (CR) of 100:1. FIG. 18(b) is a graph showing a relation between (i) a viewing angle (θ, Φ) with respect to a front direction of the liquid crystal panel 20 and (ii) a region 27 where ΔCu'v' is less than 0.02 (ΔCu'v'<0.02).

As is apparent from FIG. 18(a), the viewing angle with which the contrast ratio becomes 100:1 ranged over 170 degrees or more in every direction. This was equal to or more than a case of a liquid crystal display device adopting a conventional IPS mode.

The TBA mode differs from the IPS mode in behavior of liquid crystal molecules. With the TBA mode, in which double refraction in the liquid crystal layer 3 does not rotate but stays in a constant direction as shown in FIG. 4, it is easy to achieve a precise compensation with a phase plate such as the phase difference film 21. This makes it possible to easily achieve a wide viewing angle. As is apparent from FIGS. 18(a) and 18(b), a liquid crystal display device that uses a liquid crystal panel adopting the TBA mode, such as the liquid crystal panel 20 in accordance with the present embodiment, for example, has a characteristic that dependency of hue on viewing angle is small, and therefore is large in practical value.

As in the IPS mode, electrodes in the TBA mode may have a bended shape such as a chevron shape or a dogleg shape. This allows further improvement in viewing angle characteristics.

The phase difference film is designed according to which mode the liquid crystal display device adopts, normally black mode or normally white mode.

In Examples above, compensation of phase difference in the normally black mode is exemplified. In the normally white mode, a liquid crystal in the state of black display exhibits bend orientation in which liquid crystal molecules are horizontally aligned. Therefore, a phase difference film formed with combination of an A plate orthogonal to orientation direction (alignment direction) of the liquid crystal, a biaxial film whose main axis inclines, a C plate, and the like can be suitably used in the normally white mode.

In the liquid crystal panel 20 shown in FIG. 14, a phase plate is provided only on one main surface of the liquid crystal cell 15. Needless to say, it is possible that phase plates are provided on both sides of the liquid crystal cell 15.

In Embodiments above, it is preferable that voltage application causes a phase difference of the liquid crystal layer 3 to change by half-wave length (275 nm, in a case of using light of 550 nm wavelength, for example) or more. In view of this, it is preferable that a cell phase difference is approximately 1000 nm or more while no voltage is applied.

The liquid crystal display devices in accordance with the embodiments above may be reflective liquid crystal display devices. This allows a light path length to be doubled. By this, it is possible to reduce restrictions on liquid crystal material in terms of phase difference and to have more choices of the material. A reflective liquid crystal display device can be driven with a lower voltage compared to a transmissive liquid crystal display device, and therefore is extremely large in practical value.

As described in Embodiments above, interleave electrodes generate a distortion of electric field while a voltage is applied. However, the present embodiment is not limited to this. The distortion of electric field can be also generated by other electric-field applying component than the interleave electrodes. For example, a repetitive pattern of conductive parts and nonconductive parts formed with slits (or opening) in an electrode, for example, can also generate the distortion.

In Embodiments above, interleave electrodes 8 and 9 are provided on a substrate 1 as electric-field applying components for applying, to a liquid crystal layer 3, an electric field (horizontal electric field) parallel (may be substantially parallel) to a substrate plane. However, it is also possible to arrange so that the repetitive pattern of the conductive parts and the nonconductive parts (interleave electrode, for example) is provided on both of the substrate 1 and a substrate 2, provided that the bend orientation is not disturbed.

In the liquid crystal panel 10 shown in FIGS. 1 and 2, the interleave electrodes 8 and 9, which are provided so as to interleave with each other, extend in a direction perpendicular (or parallel) to two sides of a pixel, which sides face each other. However, the interleave electrodes 8 and 9 are not limited in direction to extend (direction to which a conductive part of an electric-field applying component extends).

Figure 32:
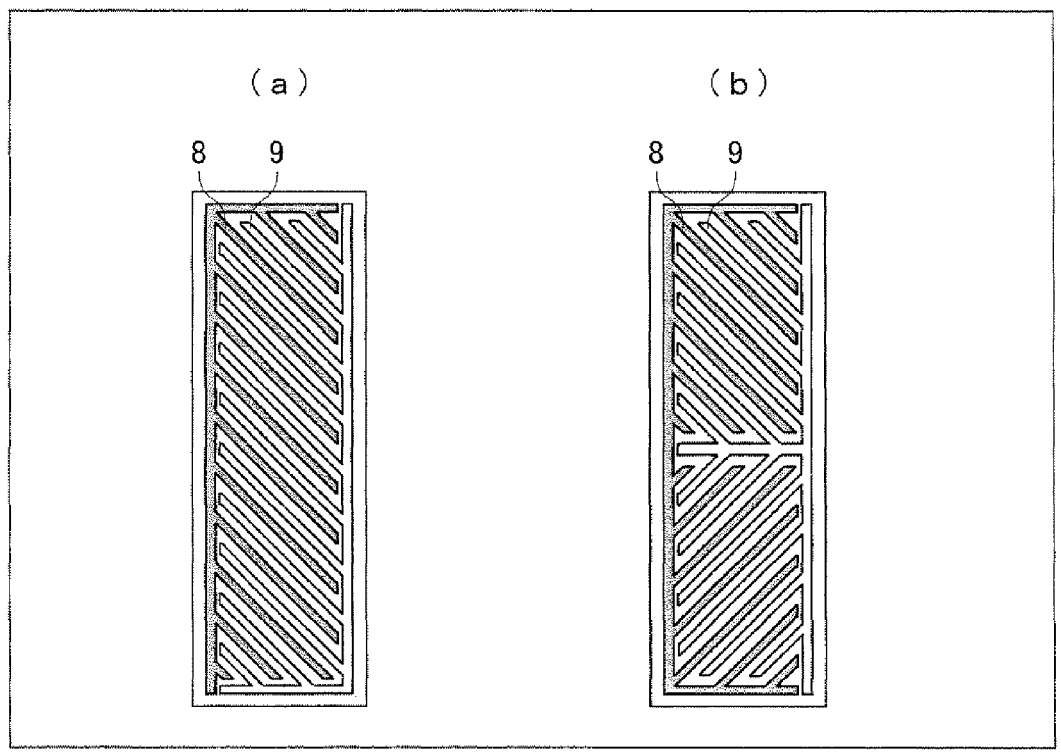
FIG. 32 Each of (a) and (b) is a plan view schematically illustrating an example of electrode pattern of a pixel display section in a liquid crystal display device in accordance with one embodiment of the present invention.

Each of FIGS. 32(a) and 32(b) illustrates an example of arrangement (electrode pattern) of the interleave electrodes 8 and 9 in a display part of a pixel.

As shown in FIGS. 32(a) and 32(b), the interleave electrodes 8 and 9 may be arranged so as to extend obliquely to two sides of the pixel, which sides face each other. Further, interleave parts of the interleave electrodes 8 and 9 may extend so as to be parallel to each other as shown in FIG. 32(a), or may be bended at a center of the pixel and extend so as not to be parallel to each other as shown in FIG. 32(b).

In the electrode pattern shown in FIG. 32(a), electric-field application automatically forms two types of domains (small regions) which exhibit different orientation from each other. In the electrode pattern shown in FIG. 32(b), in which the electrodes (interleave parts) are bended, electric-field application forms four types of domains.

In Embodiments above, a liquid crystal exhibits homogeneous orientation, which dipole moments μ of liquid crystal molecules are aligned in a single direction (including a case of a substantially single direction) in each pixel, while no voltage is applied. However, the present embodiment is not limited to this. The liquid crystal panel may include a liquid crystal layer (optical modulation layer) that is divided according to orientation of the liquid crystal molecules in each pixel. In each domain (small region) formed by division according to orientation, dipole moments p of the liquid crystal molecules are aligned in a substantially single direction while no voltage is applied. Therefore, in this case, the above-mentioned effect can be attained by arranging so that a direction of the dipole moments μ of the liquid crystal molecules to which no voltage is applied corresponds substantially to a direction of an applied electric field. That is to say, the liquid crystal panel may include, in each pixel, a plurality of domains to which an electric filed is applied in different directions.

In Embodiments above, each of the liquid crystal panels (liquid crystal display devices) is produced so that a liquid crystal layer has a thickness of 5 μm to 6 μm. Needless to say, the liquid crystal layer may have a different thickness. Increase in thickness of the liquid crystal layer allows a greater modulation when the same voltage is applied, however, generally causes increase in response time. Therefore, it is necessary to design the liquid crystal panel (liquid crystal display element) according to a type of the liquid crystal display device.

As described above, the liquid crystal panel and liquid crystal display device adopting the TBA mode are excellent in response characteristics at a low temperature and achieve a wide viewing angle, thereby being particularly suitable for use in mobile devices and the like such as a public billboard used outside, a mobile phone, and a PDA (personal digital assistance).

As described above, the liquid crystal panel, the liquid crystal display device, and the display method of the liquid crystal panel includes the liquid crystal material being a p-type liquid crystal and being constituted by liquid crystal molecules that exhibit homogeneous orientation while no voltage is applied, and electric field application onto the optical modulation layer being carried out in a direction substantially same as a direction of dipole moments of the liquid crystal molecules to which no voltage is applied. Therefore, the liquid crystal molecules of the liquid crystal material exhibit bend orientation curved in a thickness direction of a substrate while an electric field is applied.

With the liquid crystal panel, the liquid crystal display device, and the display method of the liquid crystal panel, a direction of an applied electric field is substantially same as directions of dipole moments of liquid crystal molecules to which no electric field is applied and to which an electric field is applied, and the liquid crystal molecules continuously change their orientation from homogeneous orientation to bend orientation in response to electric-field application without any initial orientation conversion operation. Therefore, according to the present embodiment, it is possible to achieve non-conventional and beneficial effects as follows: (1) it is possible to achieve a high-speed response like an OCB mode; (2) it is possible to achieve a viewing angle equivalent to or wider than an IPS mode; and (3) it is unnecessary to perform an initial operation for splay-bend orientation conversion, which is essential in the OCB mode.

As described above, in the liquid crystal panel, the liquid crystal display device, and the display method of the liquid crystal, an electric field is applied in the substantially same direction as (direction substantially parallel to) the dipole moments of the liquid crystal molecules of a homogeneously-oriented liquid crystal so that a distribution of electric-field intensity (distortion of electric field) is generated in an optical modulation layer. According to this distribution, the liquid crystal molecules exhibit bend orientation so that alignment of the liquid crystal molecules is disarrayed (formation of bend alignment). This causes a change of phase difference in the optical modulation layer. In this way, the liquid crystal panel, the liquid crystal display device, and the display method of the liquid crystal panel carry out a display.

With the arrangement, the display panel further includes electrodes as electric-field application components for applying an electric field to the optical modulation layer, the electrodes having a repetitive pattern of conductive parts and nonconductive parts in each pixel. Therefore, a so-called horizontal electric field, which is parallel (may be substantially parallel) to a substrate, can be applied to the optical modulation layer. This makes it possible to easily generate a distribution of electric-field intensity (distortion of electric field).

The electrodes can be interleave electrodes (comb-like electrodes), for example. The narrower an electrode interval becomes, the larger distortion of electric field and the greater change in phase difference can be generated. The use of interleave electrodes as the electrodes makes it possible to easily generate a greater change in phase difference with a conventional electrode arrangement.

It is preferable that the conductive part of the electrodes is made of ITO. In the liquid crystal panel, rotation of director occurs in response to voltage application above the conductive part, rather than above the nonconductive part (intervals between the interleave electrodes, for example). That is to say, a degree of inclination (disarray) of the liquid crystal molecules at the time of electric-field application becomes larger above the conductive part. Therefore, by forming the conductive part with a transparent electrode, especially ITO, it becomes possible to widen a range of adjustment in phase difference for use in displaying. The wide range of adjustment in phase difference allows a reduction in driving voltage. Therefore, this arrangement can add a significantly large value to the liquid crystal panel and the liquid crystal display device, each of which adopts the above-mentioned display mode.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

A TEA mode is a new display mode that can convert orientation from initial homogeneous orientation to bend orientation by generating a distribution of electric-field intensity in a liquid crystal layer in response to electric-field application. The TBA mode can achieve a high-speed response like an OCB mode and can achieve a viewing angle equivalent to or wider than an IPS mode. Further, the TBA mode does not require an initial operation for splay-bend orientation conversion, which is essential in the OCB mode. Therefore, a liquid crystal panel, a liquid crystal display device, and a display method of the liquid crystal panel, each of which adopts the TBA mode, can be particularly suitable for use in mobile devices and the like such as a public billboard used outside, a mobile phone, and a PDA, which require response capability at a low temperature and a wide viewing angle.

The invention claimed is:

1. A liquid crystal panel comprising:
   an optical modulation layer comprising a liquid crystal material between a pair of substrates,
   the liquid crystal material being a p-type liquid crystal and comprising liquid crystal molecules that exhibit homogeneous orientation while no voltage is applied, and
   first and second electrodes on the same substrate, wherein the first and second electrodes apply an electric field to the optical modulation layer in a direction substantially same as a direction of dipole moments of the liquid crystal molecules to which no voltage is applied.

2. The liquid crystal panel according to claim 1, wherein electrodes for applying the electric field to the optical modulation layer have a repetitive pattern of conductive parts and nonconductive parts in each pixel.

3. The liquid crystal panel according to claim 2, wherein the conductive parts comprise ITO.

4. The liquid crystal panel according to claim 2, wherein the electrodes are interleave electrodes.

5. A liquid crystal display device comprising a liquid crystal panel recited in claim 1.

6. The liquid crystal panel of claim 1, wherein said first and second electrodes on the same substrate are each comb-shaped.

7. A liquid crystal panel comprising:
   an optical modulation layer comprising a liquid crystal material between a pair of substrates,
   at least one of the substrates being transparent,
   the liquid crystal material being constituted by liquid crystal molecules that exhibit homogeneous orientation while no voltage is applied, and
   the liquid crystal molecules exhibiting bend orientation curved in a thickness direction of the substrates, while an electric field is applied by first and second interleaved electrodes supported by one substrate of said at least one of said substrates, said electric field being applied to the liquid crystal molecules between the first and second interleaved electrodes.

8. A liquid crystal display device comprising a liquid crystal panel recited in claim 7.

9. A display method of a liquid crystal panel including an optical modulation layer including a liquid crystal material comprising p-type liquid crystal, the method comprising:
   causing liquid crystal molecules of the liquid crystal material comprising p-type liquid crystal to exhibit homogeneous orientation while no voltage is applied; and
   causing first and second electrodes on the same substrate to apply an electric field to the optical modulation layer in a direction substantially the same as a direction of dipole moments of the liquid crystal molecules exhibiting the homogeneous orientation.

10. The method of claim 9, wherein said first and second electrodes on the same substrate are each comb-shaped.

* * * * *